Figure 1:
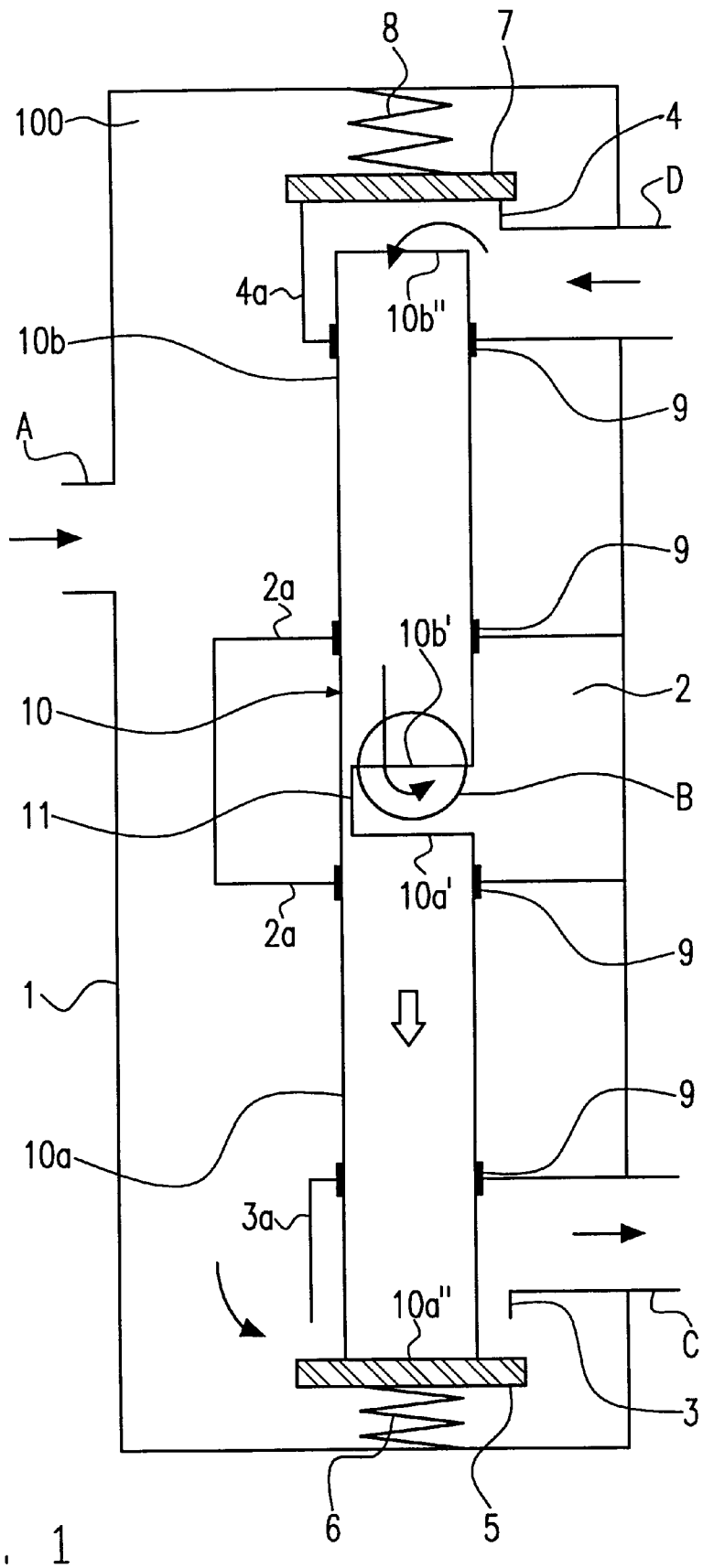

United States Patent [19]
Hirota

[11] Patent Number: 6,145,541
[45] Date of Patent: Nov. 14, 2000

[54] FOUR-WAY SELECTOR VALVE

[75] Inventor: Hisatoshi Hirota, Tokyo, Japan

[73] Assignee: TGK Co. Ltd., Tokyo, Japan

[21] Appl. No.: 09/224,017

[22] Filed: Dec. 31, 1998

[30] Foreign Application Priority Data

| Jan. 5, 1998 | [JP] | Japan | 10-000023 |
| Mar. 2, 1998 | [JP] | Japan | 10-049076 |

[51] Int. Cl.[7] .............. E03C 1/00; E03B 1/00; F17D 3/03
[52] U.S. Cl. .............. 137/627.5; 137/596.18; 137/596.16; 137/596.15
[58] Field of Search .............. 137/625.6, 625.64, 137/625.67, 625.68, 627.5, 596.18, 596.16, 596.15

[56] References Cited

U.S. PATENT DOCUMENTS

| 560,550 | 5/1896 | Smith | 137/627.5 |
| 1,293,858 | 2/1919 | Mills | 137/627.5 |
| 2,867,237 | 1/1959 | Allingham | 137/625.29 |
| 2,989,974 | 6/1961 | Blair | 137/113 |
| 3,857,411 | 12/1974 | Moon, Jr. | 137/627.5 |
| 4,067,357 | 1/1978 | Ruchser | 137/596.16 |
| 4,176,687 | 12/1979 | Ensign | 137/625.65 |
| 4,805,666 | 2/1989 | Araki et al. | 137/625.43 |
| 5,558,125 | 9/1996 | Sell | 137/625.27 |

*Primary Examiner*—Denise L. Ferensic
*Assistant Examiner*—Ken B. Rinehart
*Attorney, Agent, or Firm*—Nilles & Nilles SC

[57] ABSTRACT

A four-way selector valve comprises a valve case connected with a first pipe, a separate chamber communicating with a second pipe, a first valve seat ring in communicating path between a connecting portion of a third pipe and a space of said valve case, a second valve seat ring in a communicating path between a connecting portion of a fourth pipe and said space, a moveable valve element assembly for alternating co-operation with said first and second valve seat rings, and a valve drive means connected to said moveable valve element assembly to at least selectively interconnect said first pipe either with said third pipe or said fourth pipe and simultaneously the remaining one of said third or fourth pipes with said second pipe, wherein first and second valve disks are pressed essentially in the direction of the axis of the associated valve seat ring in closing direction by remanent forces onto said first and second valve seat rings, and first and second cylindrical and hollow valves are moveable substantially in the direction of the axis of the associated valve seat ring into respective lifting engagement with said valve disks to obtain different interconnecting states between the four pipes.

8 Claims, 22 Drawing Sheets

FOUR-WAY SELECTOR VALVE

The present invention relates to four-way selector valves particularly useful for selecting different interconnections between refrigerant pipes of a heating-cooling combination apparatus of a heat-pump type in automobiles, etc.

A four-way selector valve as known from practice allows to change between at least two communicating states of four external pipes A, B, C, D, including a state of interconnecting pipe A with pipe C and simultaneously pipe 8 with pipe D, and another state where pipe A communicates with pipe D while simultaneously pipe B communicates with pipe C. Pipe B has to be separated from pipe A permanently. In the general structure of the known four-way selector valves, the moveable valve element assembly is defined by a cup-shaped slide valve arranged to slide lineally in spring loaded contact with a flat valve seat surface containing plural valve seats each communicating with one of the pipes. Moving said slide valve allows to selectively change between the above-mentioned communication states. The slide valve and the valve seat surface must be made from rigid materials and need excellent sliding properties and flatness with extremely high accuracy in a mirror-finished surface level so that the mutually co-operating components not only are very expensive but also have the disadvantage of leakage caused by wear. Due to the linear sliding motion between the slide valve and the seat surface no rubber seal members, etc. can be used between said slide valve and said valve seat surface, because such soft seal members are damaged quickly. Also known from practice is to use pistons in guide cylinders of the valve case in order to displace the slide valve lineally along said seat surface. The actuation of said piston can be controlled by means of solenoid pilot valves generating the necessary actuation forces for both pistons e.g. on the basis of a pressure difference existing between several of the pipes.

It is an object of the invention to provide a four-way selector valve without seal members machined with high accuracy but with simple components only needing a general level of preciseness, but nevertheless ensuring the necessary communication states in a leakage proof manner. Said object can be achieved with a four-way selector valve being designed with the features contained claim 1.

Due to the fact that both valve disks are moved counter to the remanent forces loading them in closing direction, at least essentially in the direction of the axis of the associated valve seat ring, since each hollow, cylindrical valve also is moved in its axial direction only and essentially in the direction of the axis of the associated valve seat ring simple and reliable and resilient sealing components can be use like rubber disks or disk rings or O-rings or other types of sealing rings without the necessity of high surface machining measures. Furthermore, the co-operation of the valve disks with their associated valve seat rings as well said second ends of both cylindrical valves allows to easily obtain further communication states in addition to a state where the first pipe is connected either with the third or the fourth pipe while simultaneously the fourth or the third pipe is interconnected with the second pipe. In said further communication states either all pipes can be separated from each other or the first pipe can be interconnected simultaneously with the third and fourth pipes or the third and fourth pipes while the second pipe is completely separated or the third and fourth pipes simultaneously can be interconnected with the second pipe while the first pipe simultaneously is completely separated from all other pipes.

Preferred embodiments are described in the depending claims.

Figure 2:
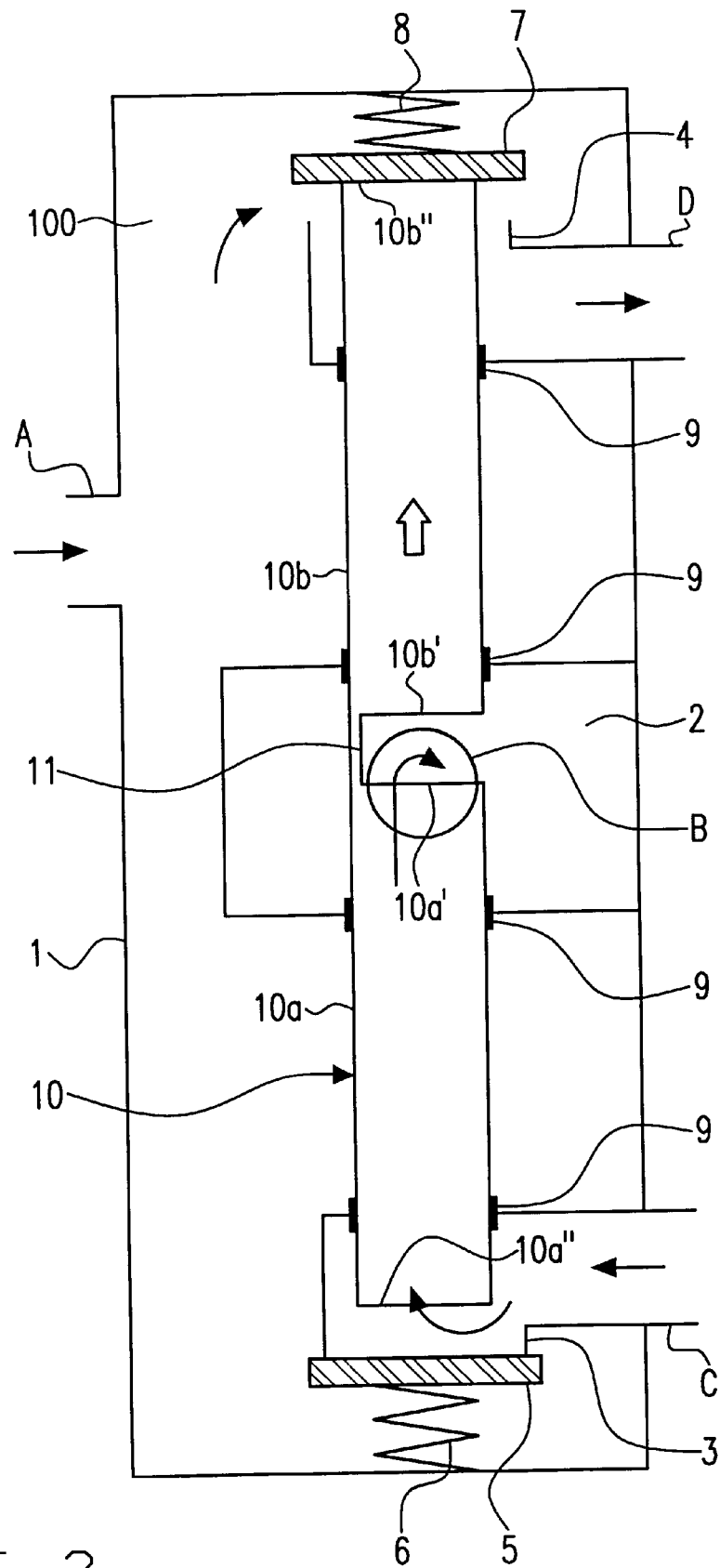
Figure 3:
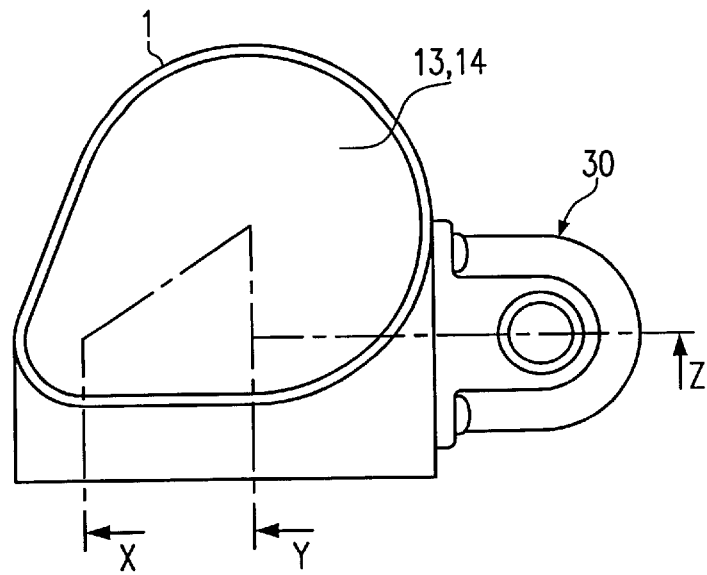
Figure 5:
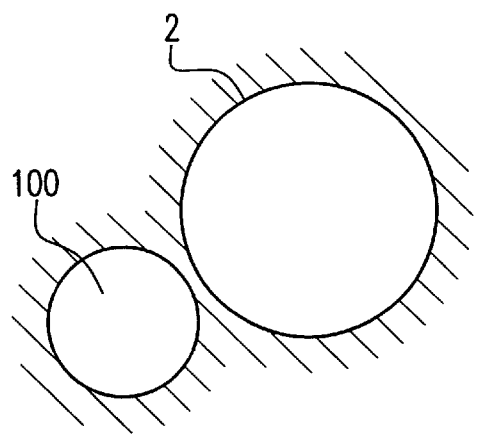
Figure 6:
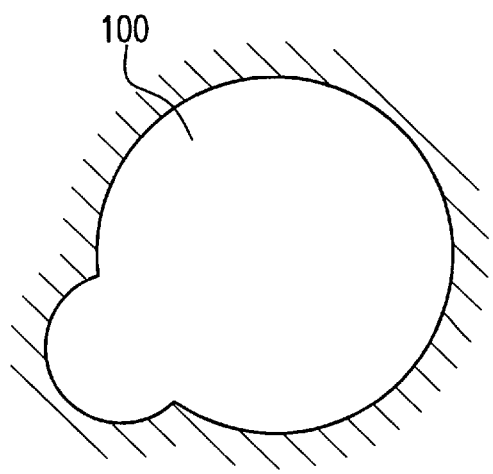
Figure 4:
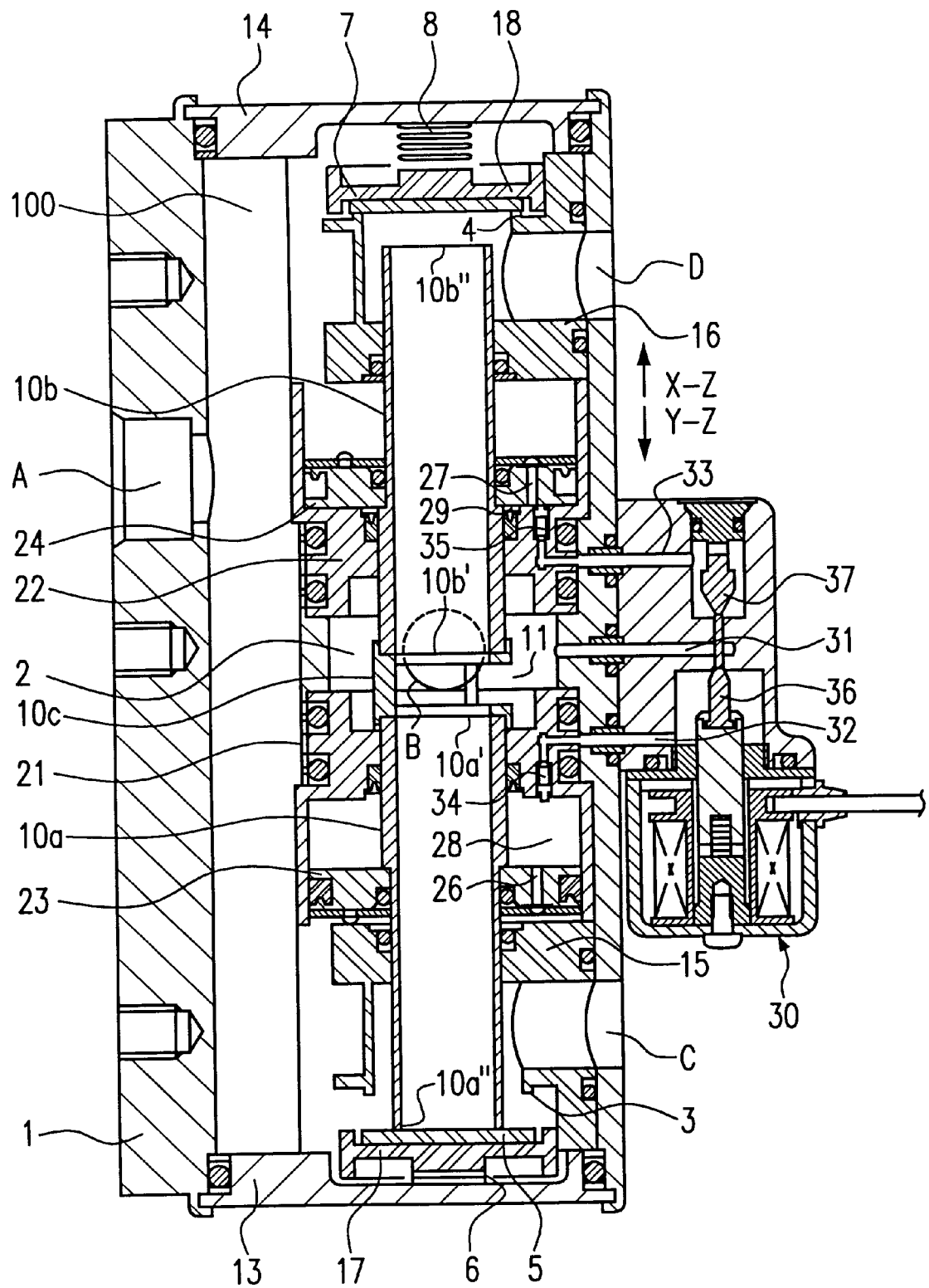
Figure 7:
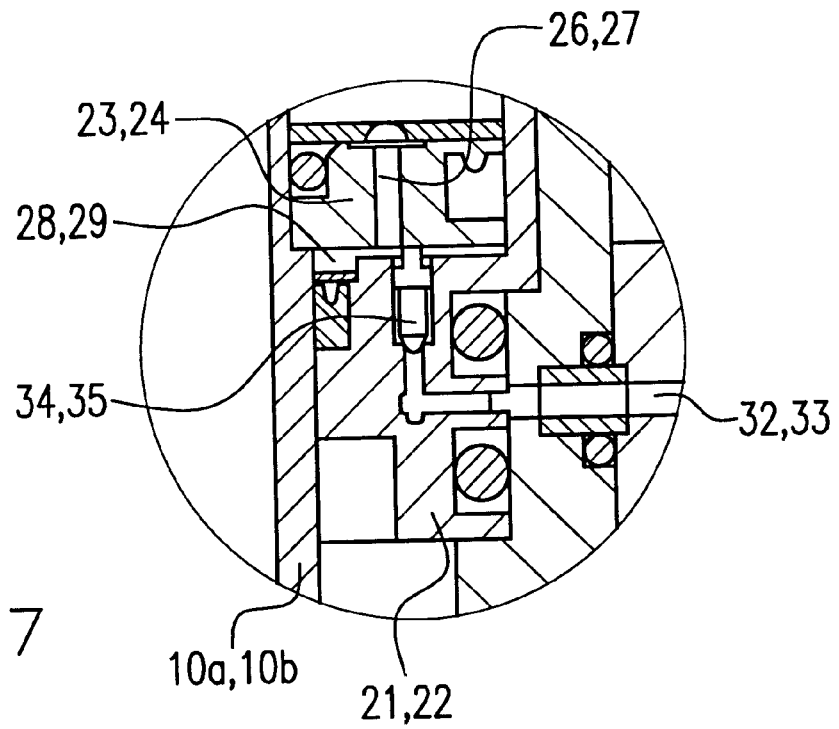
Figure 8:
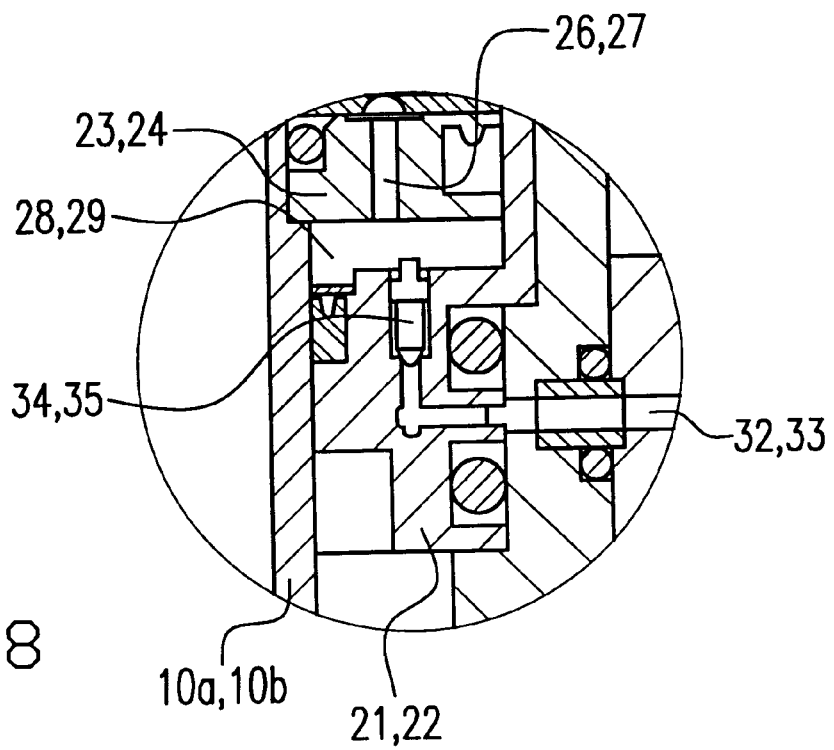
Figure 9:
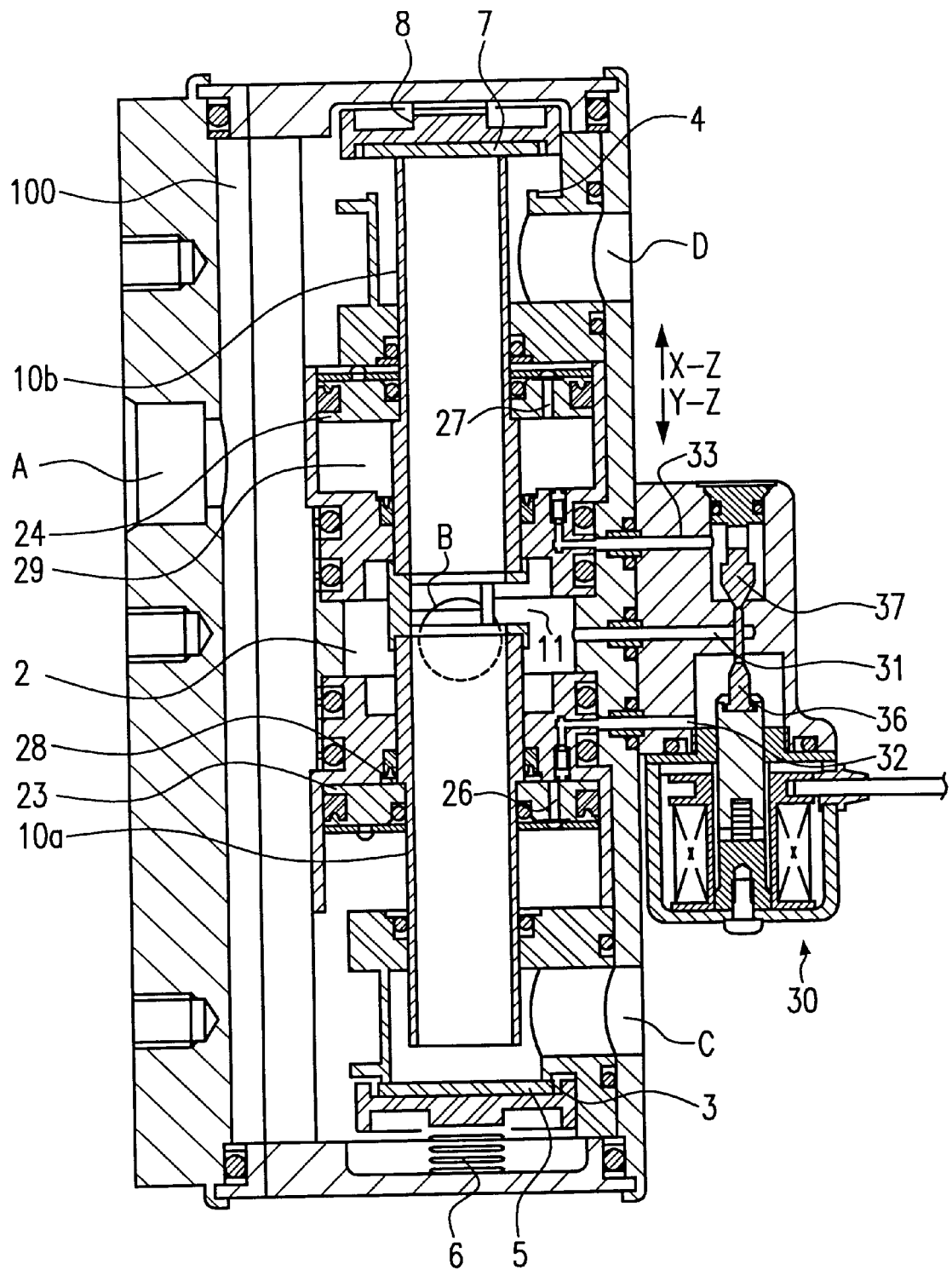
Figure 10:
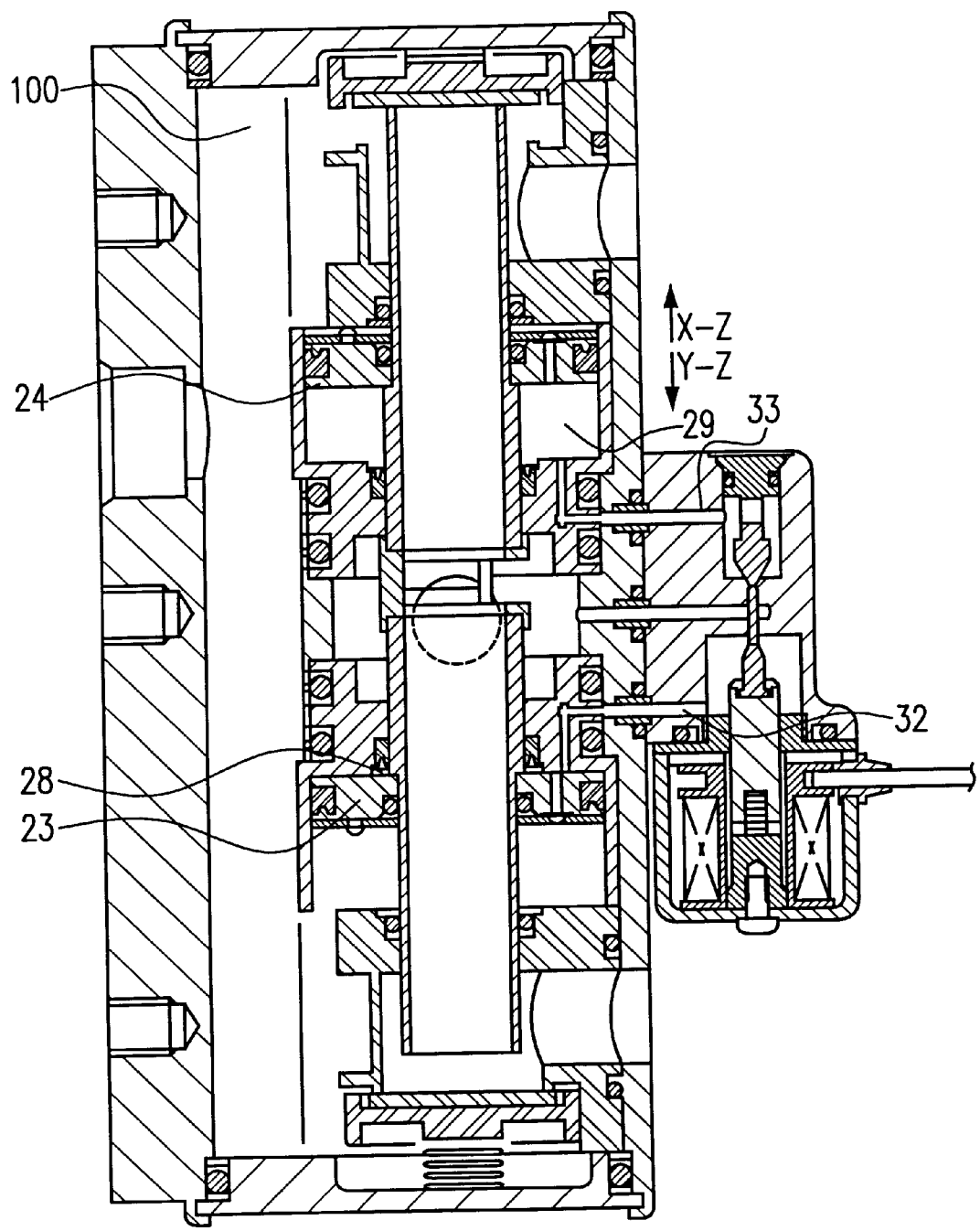
Figure 11:
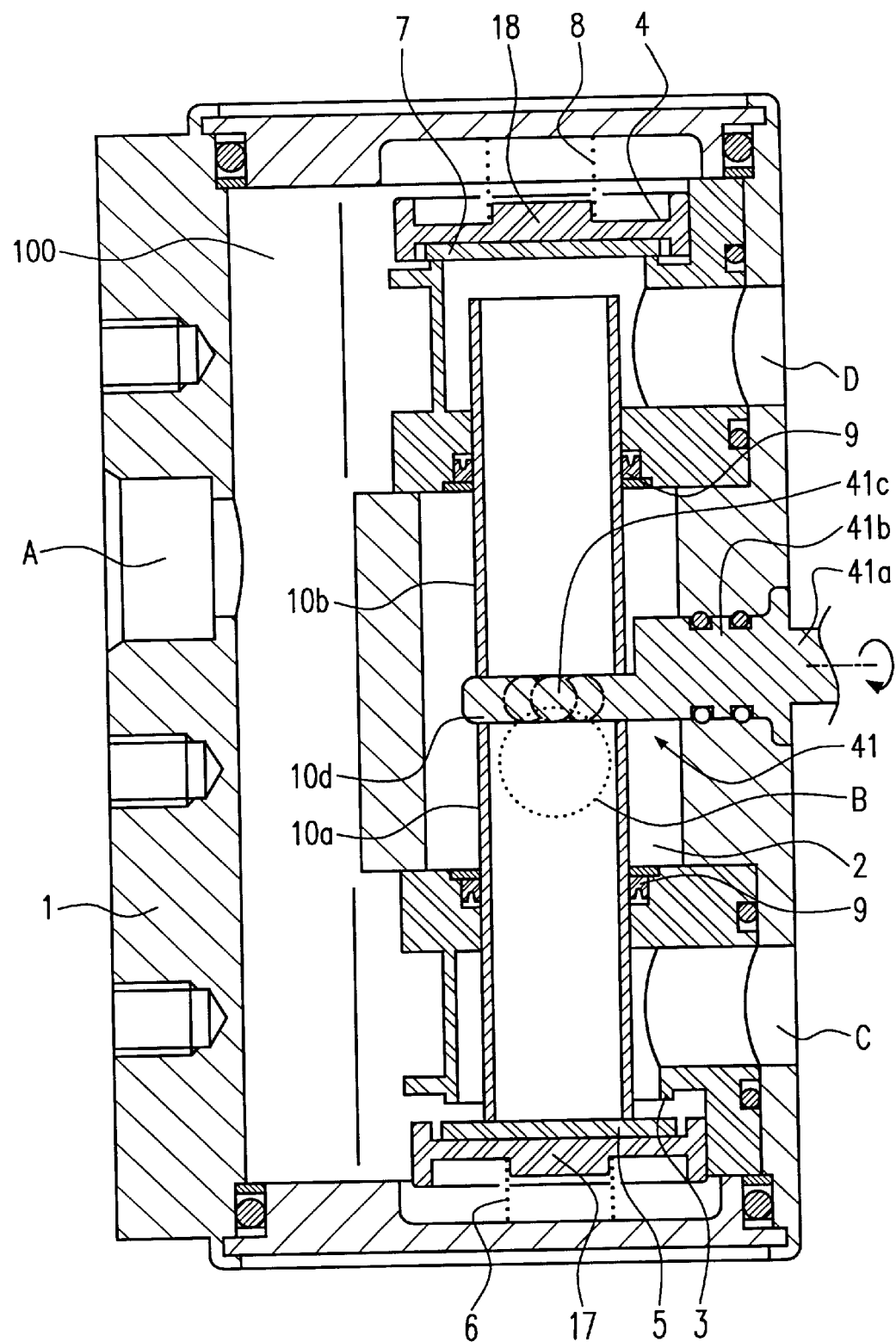
Figure 12:
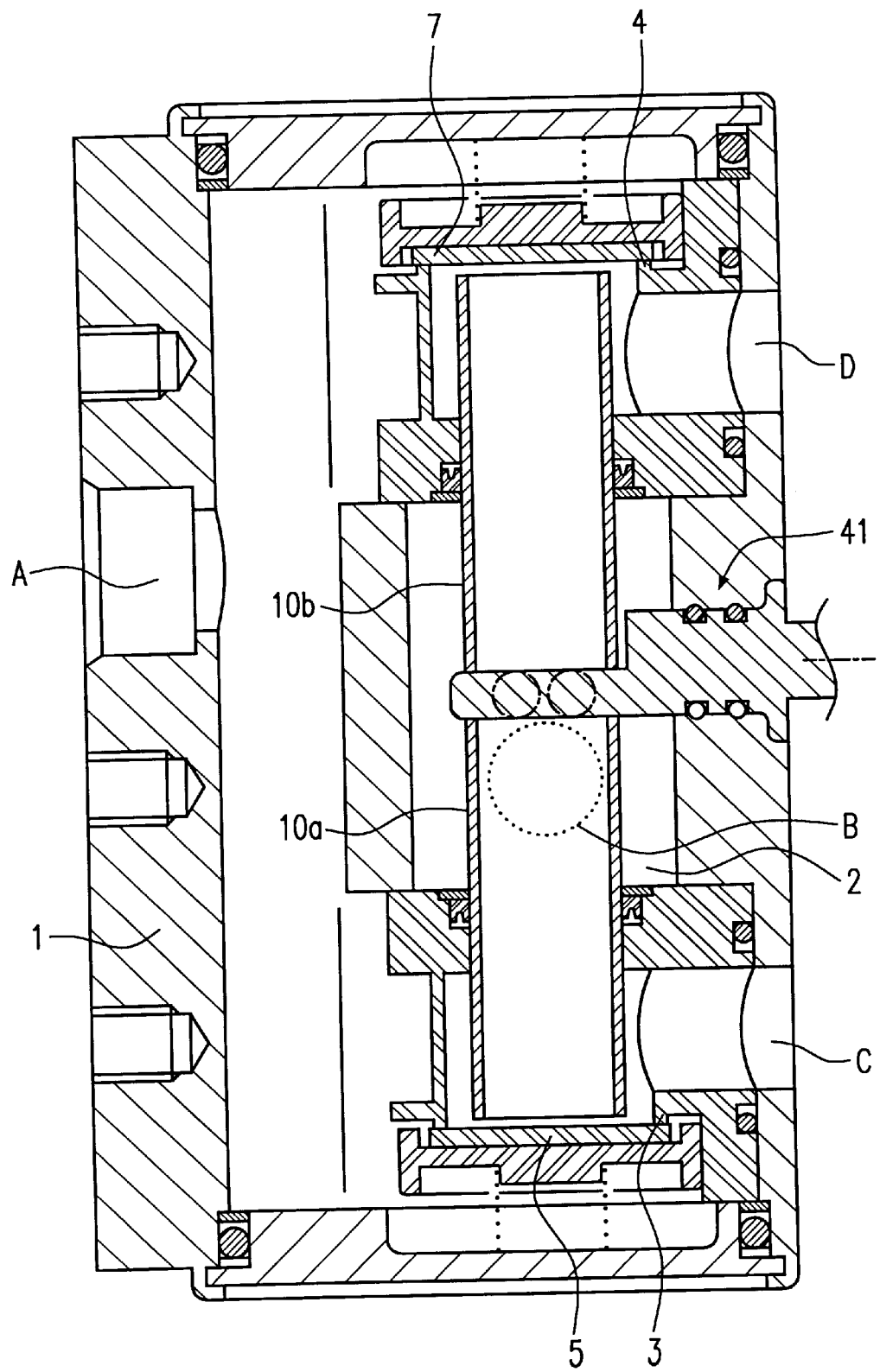
Figure 13:
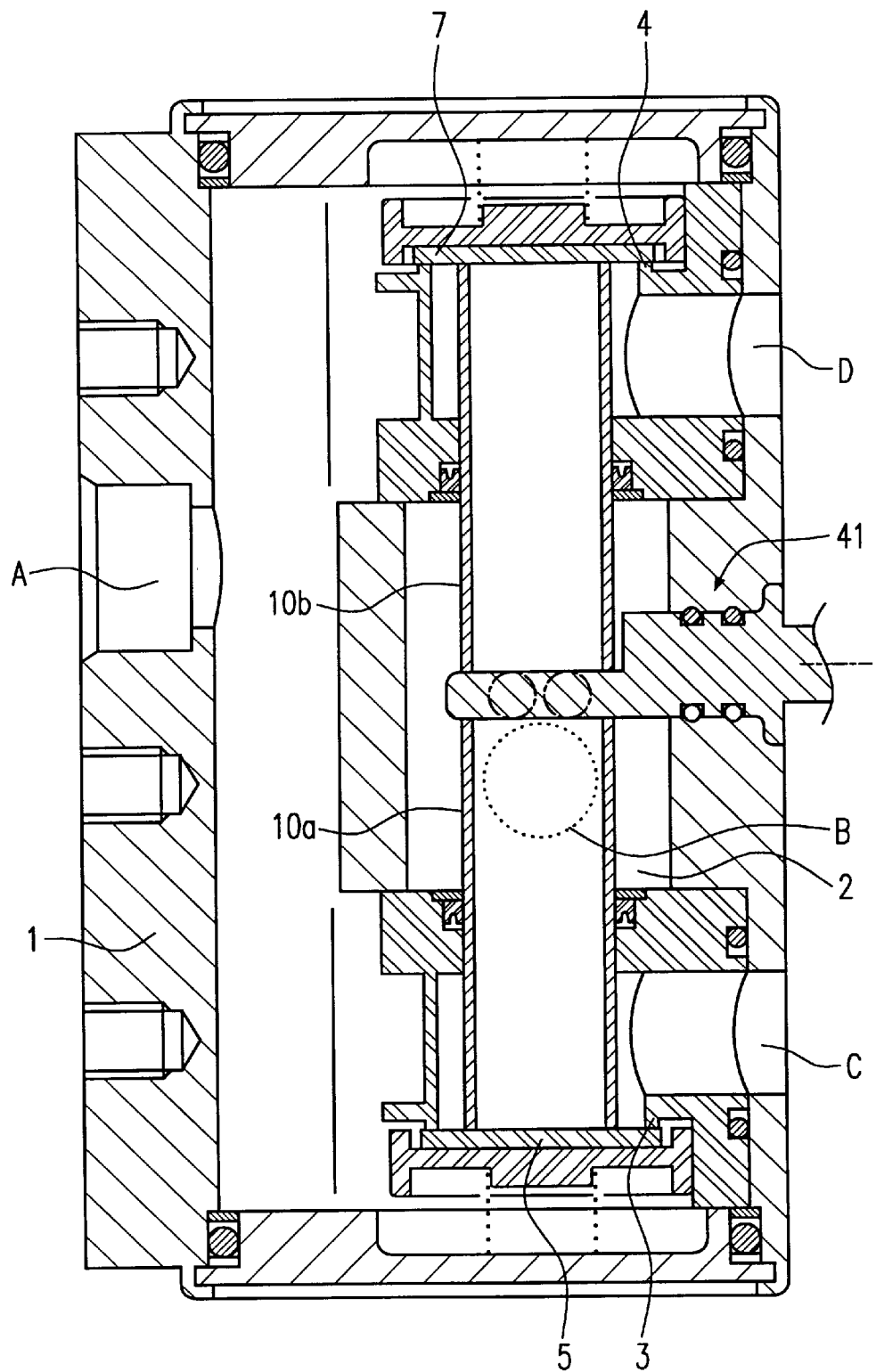
Figure 14:
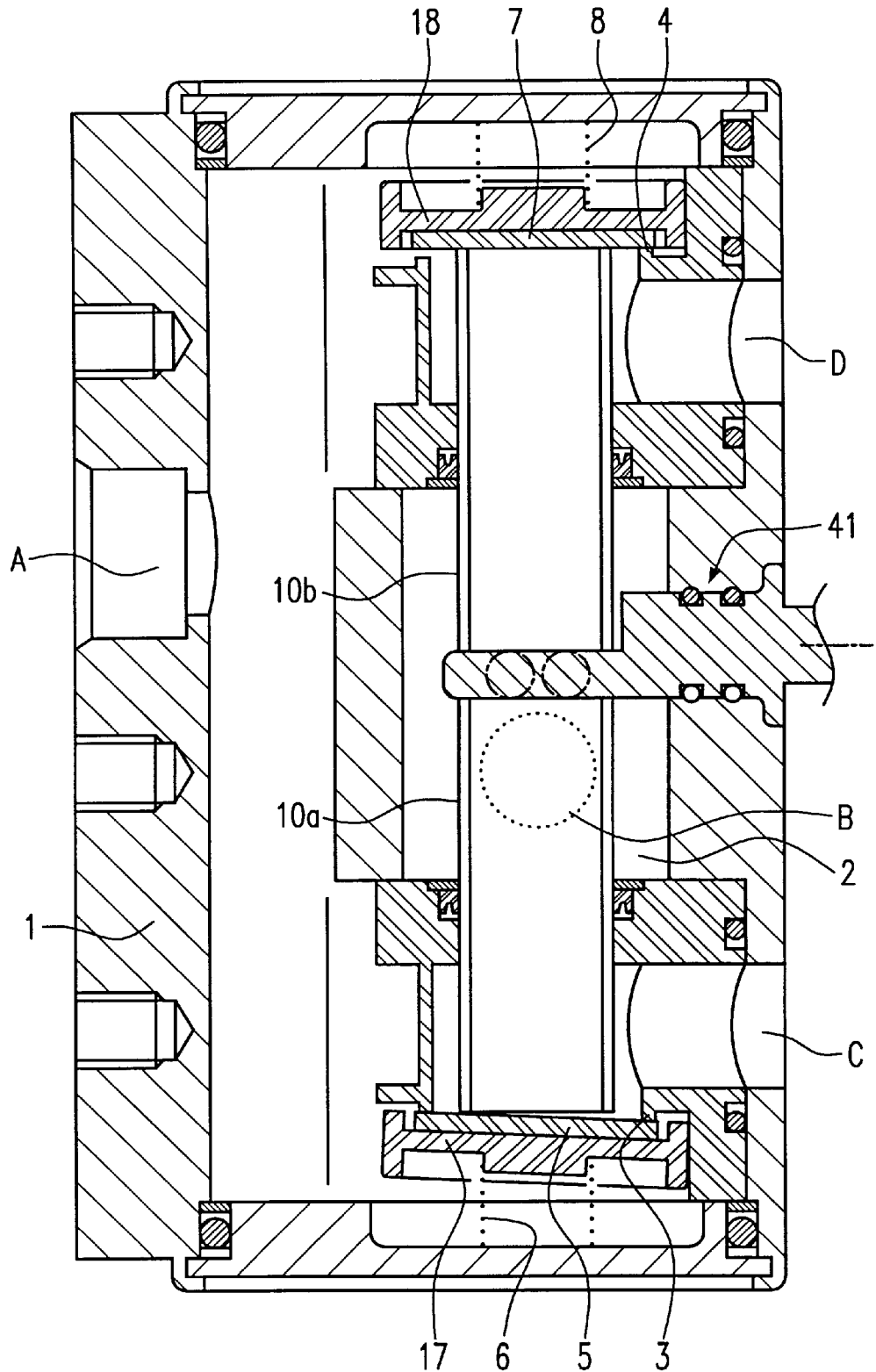
Figure 15:
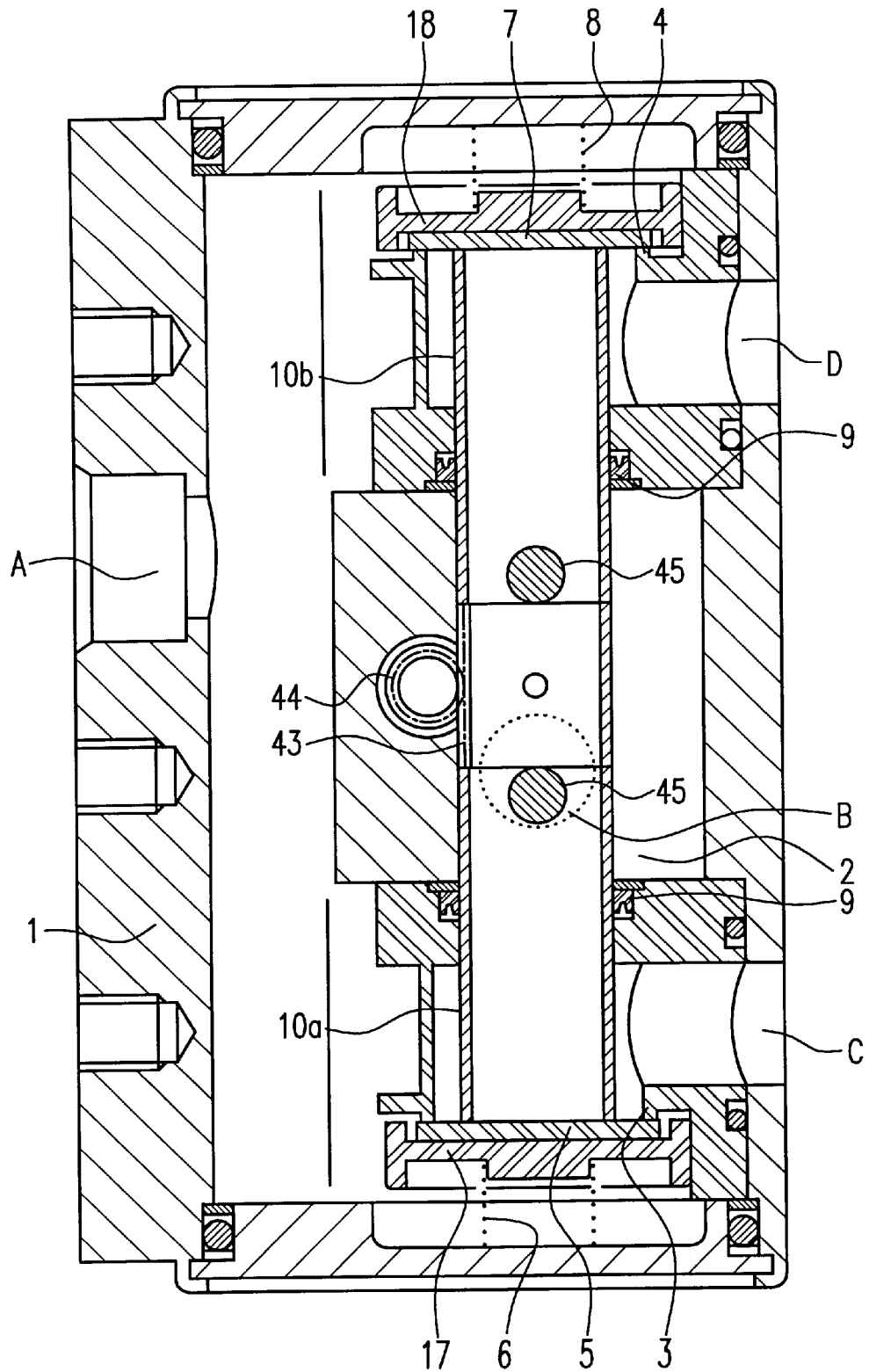
Figure 16:
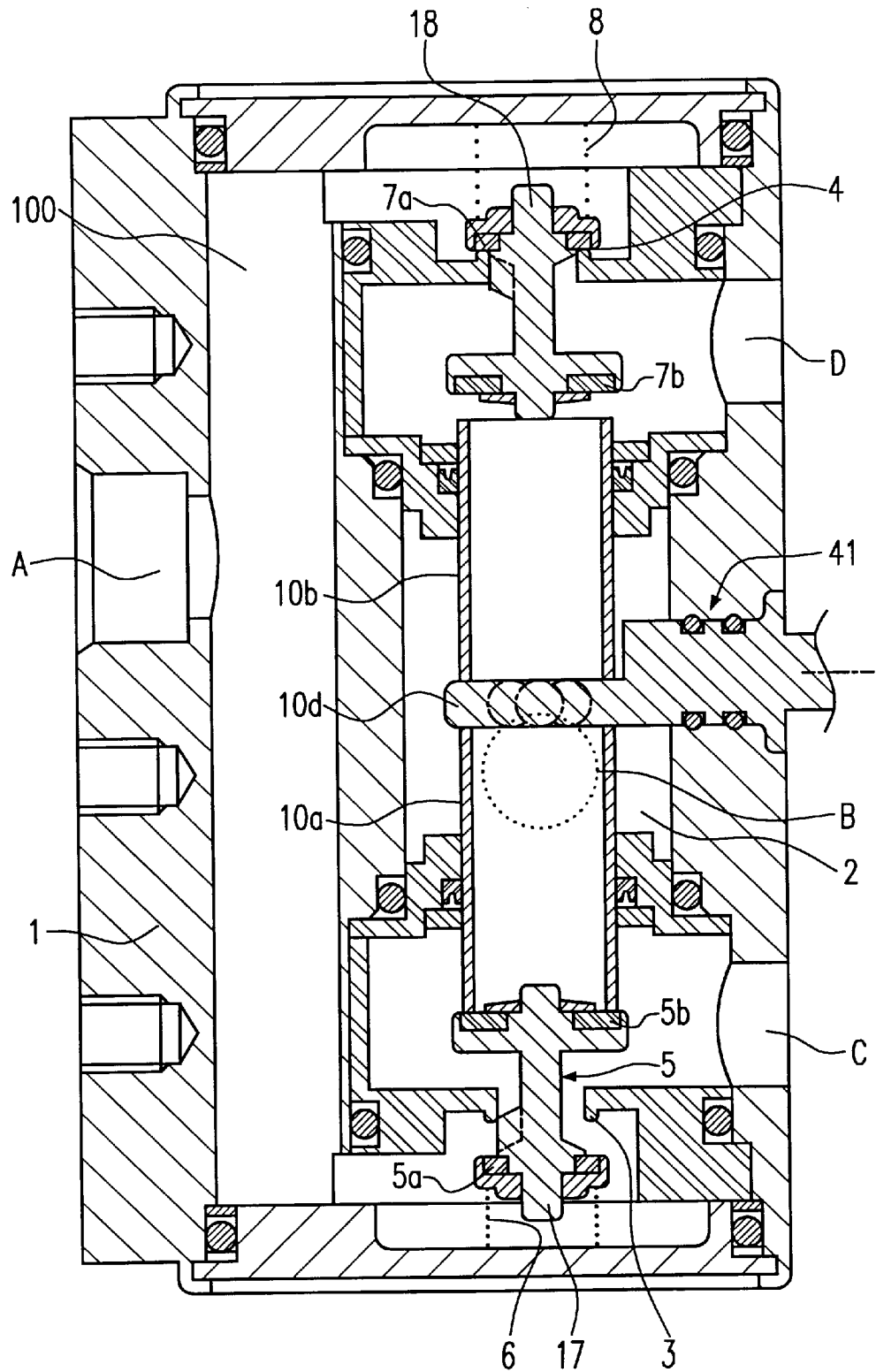
Figure 17:
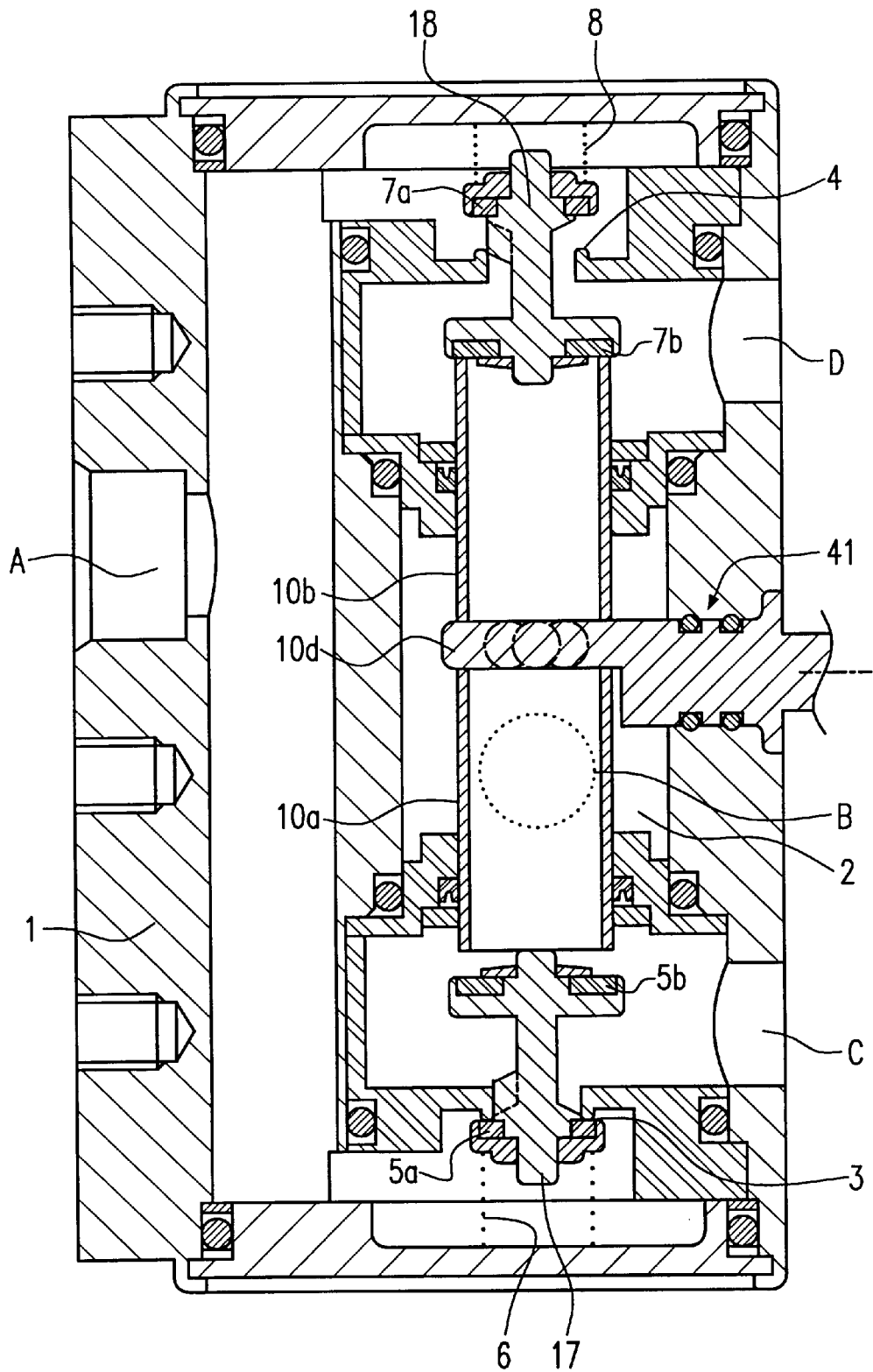
Figure 18:
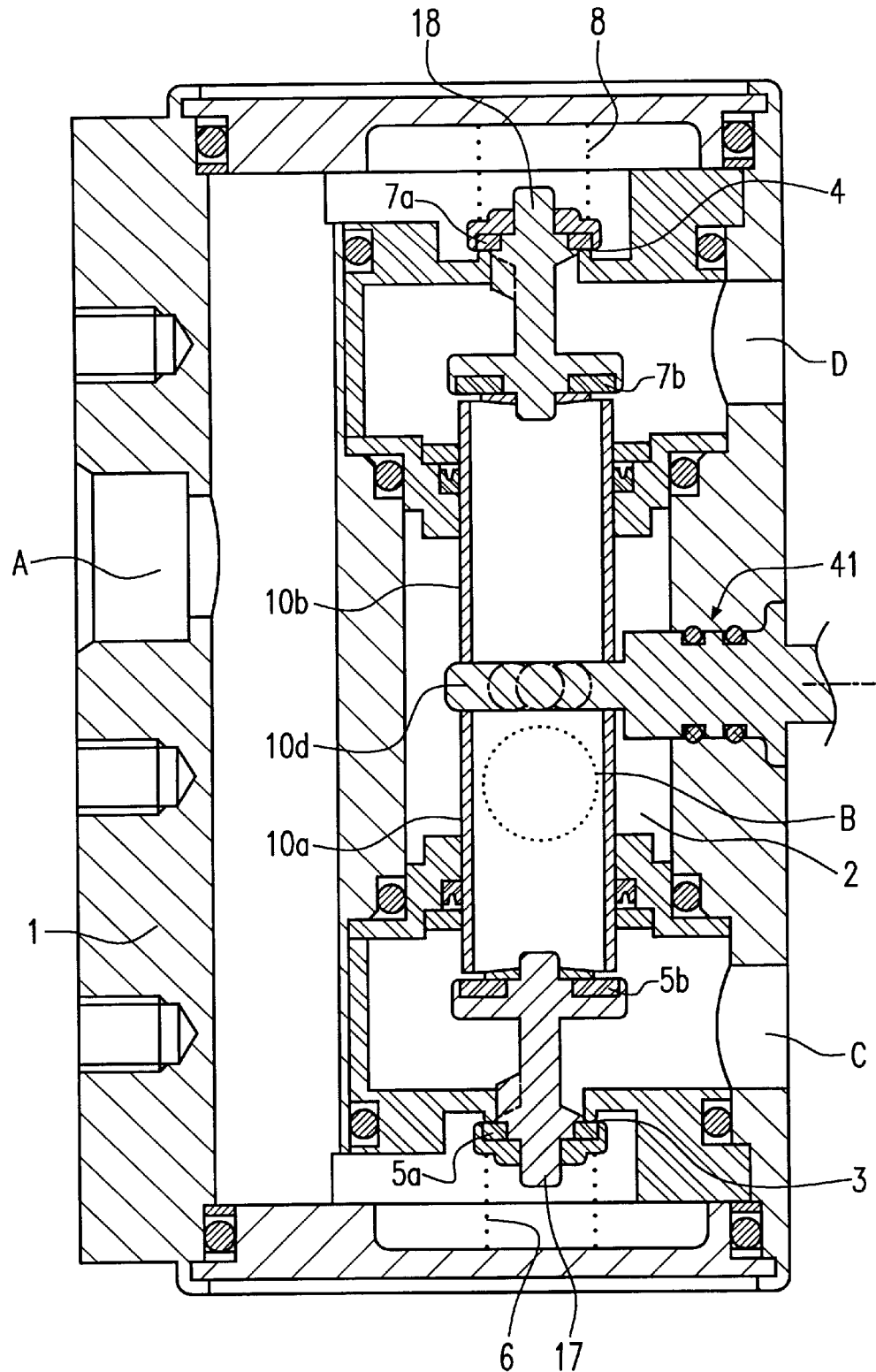
Figure 19:
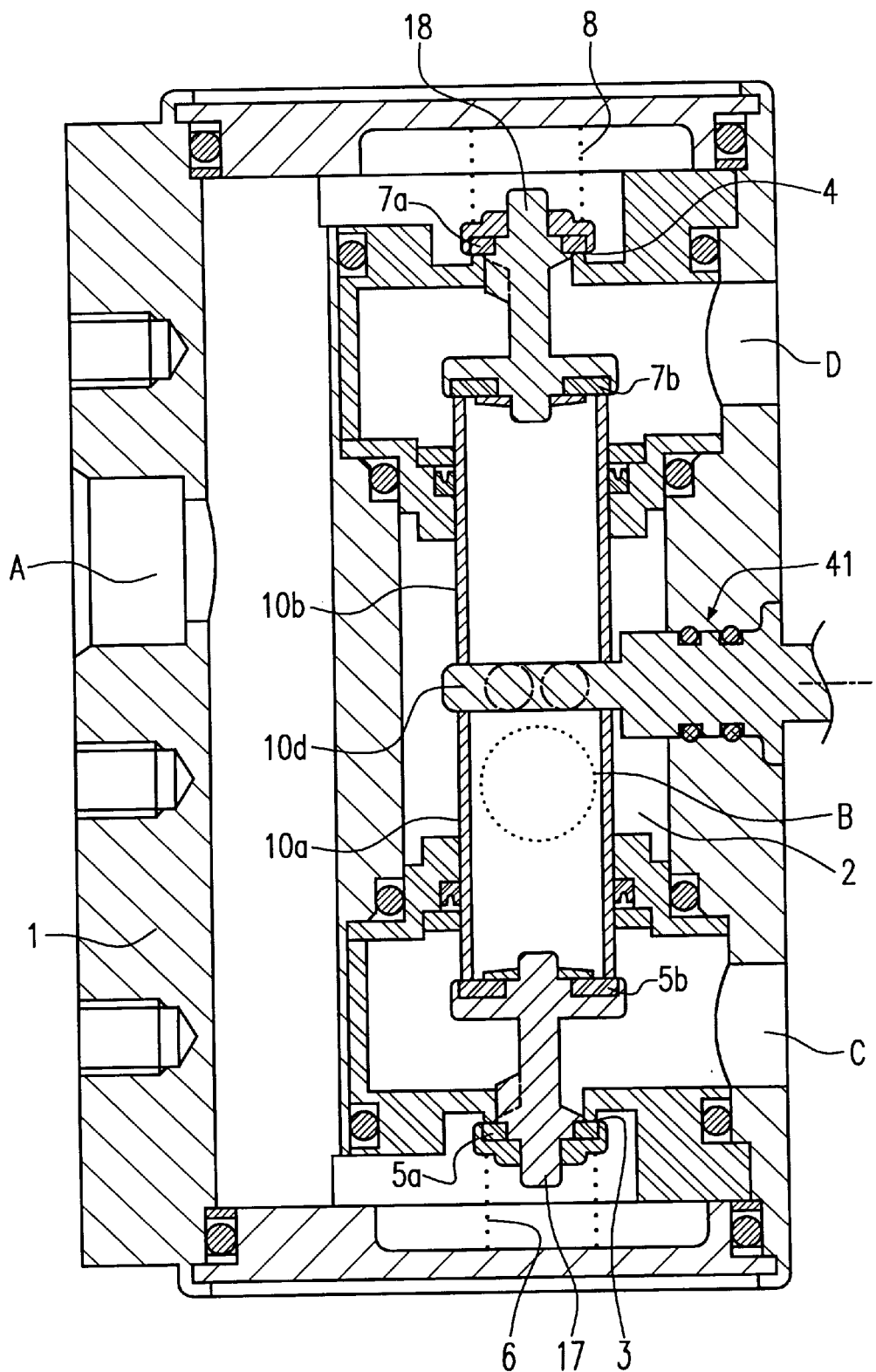
Figure 20:
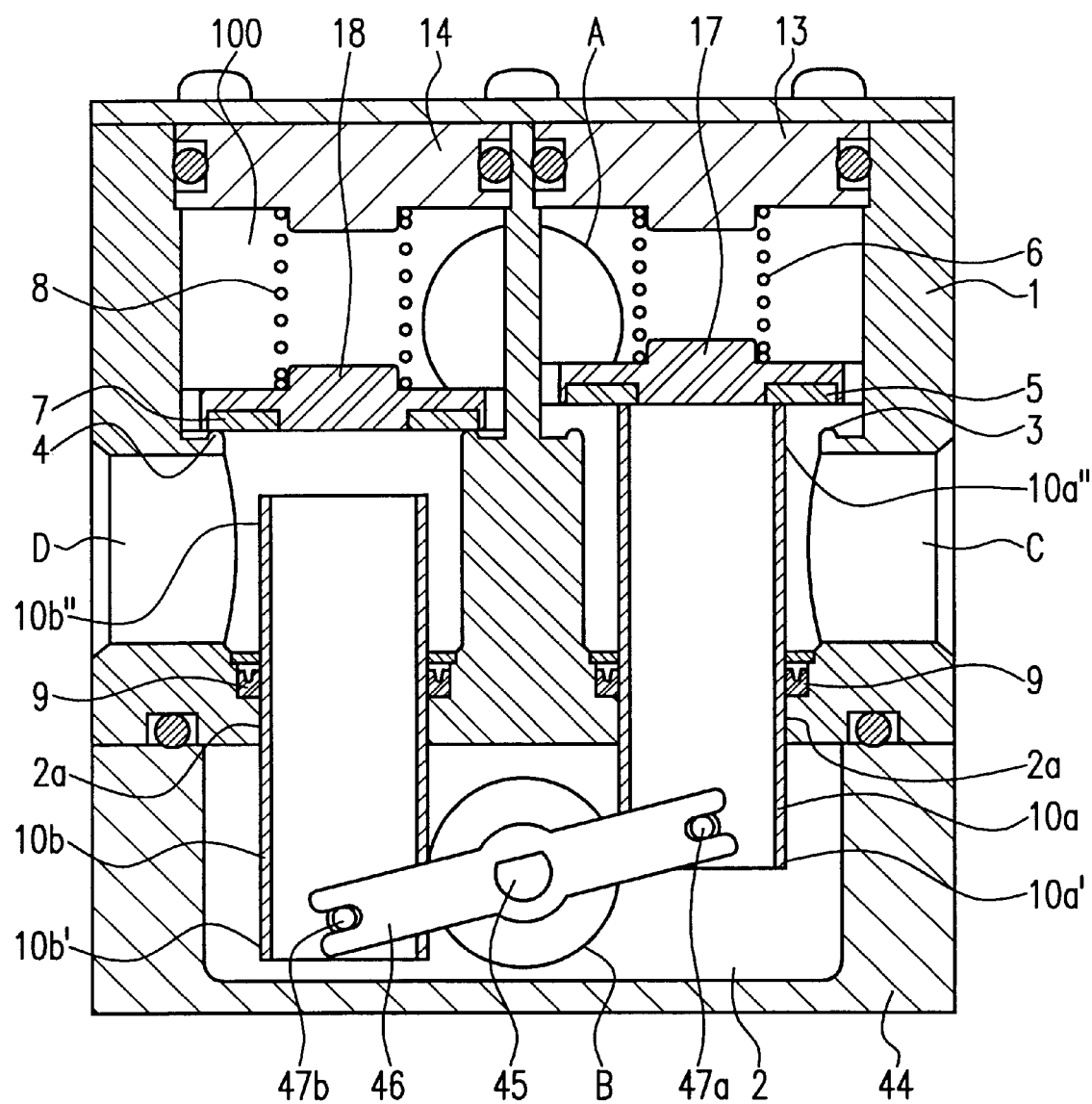
Figure 21:
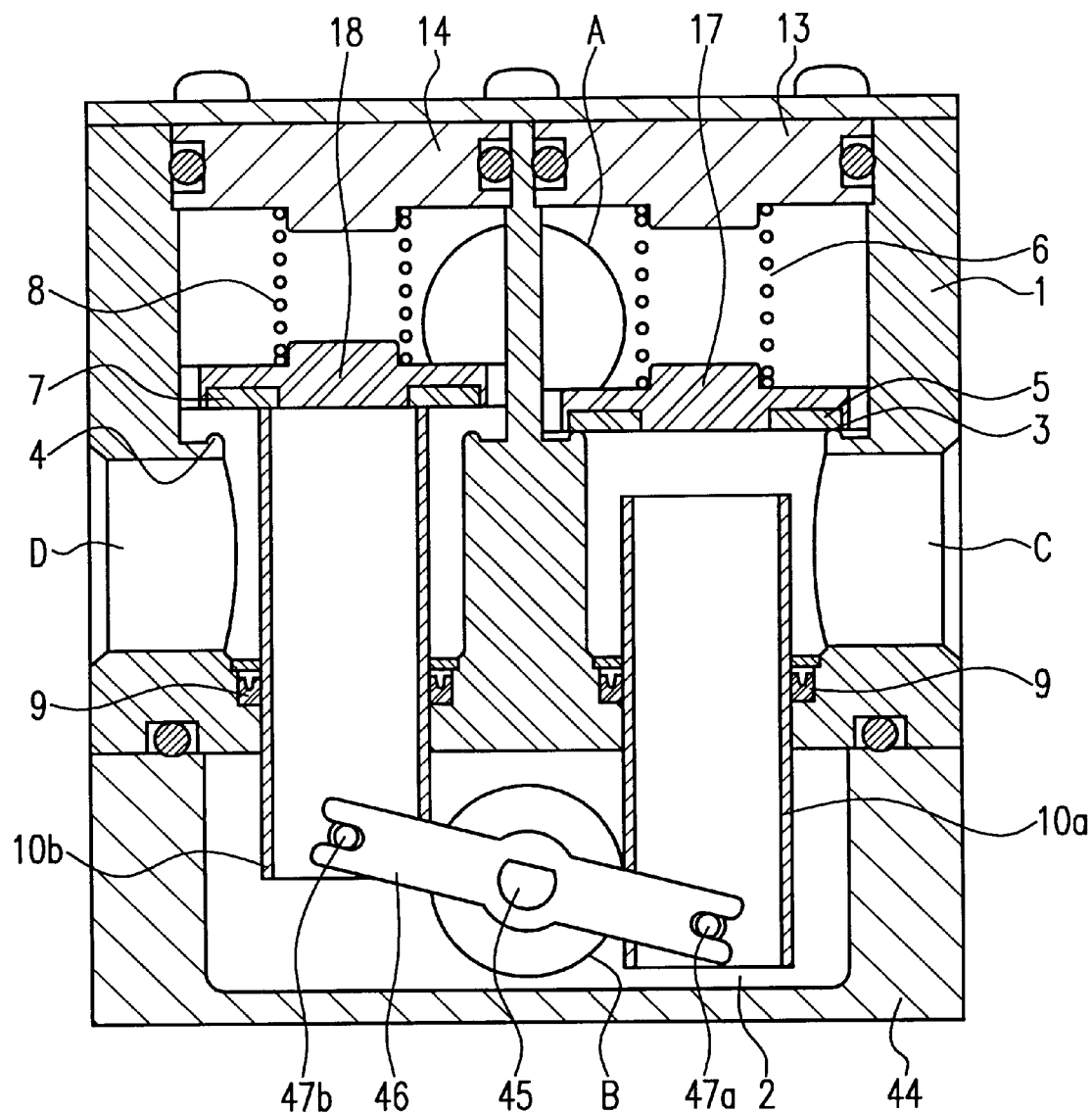
Figure 22:
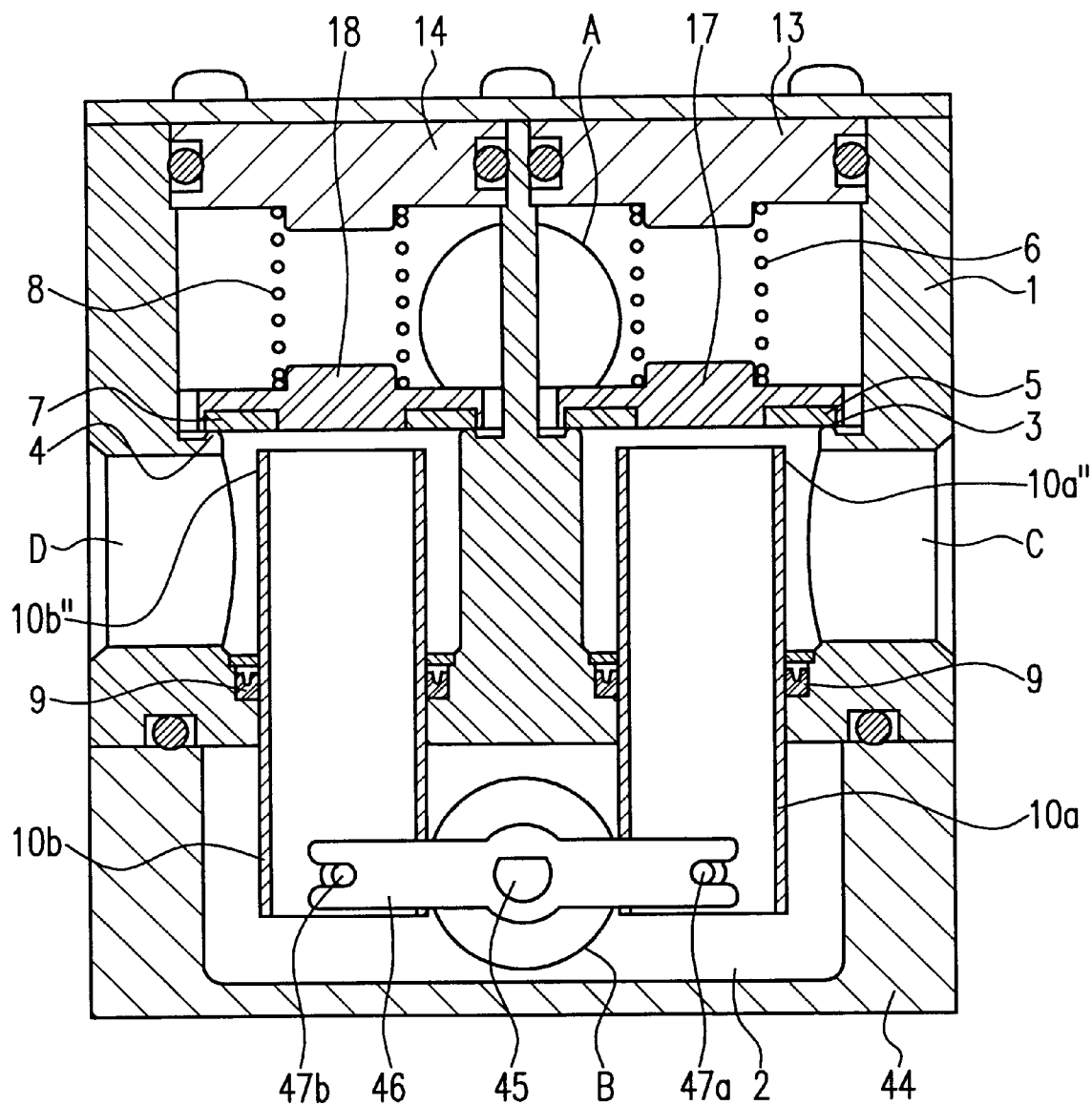
Figure 23:
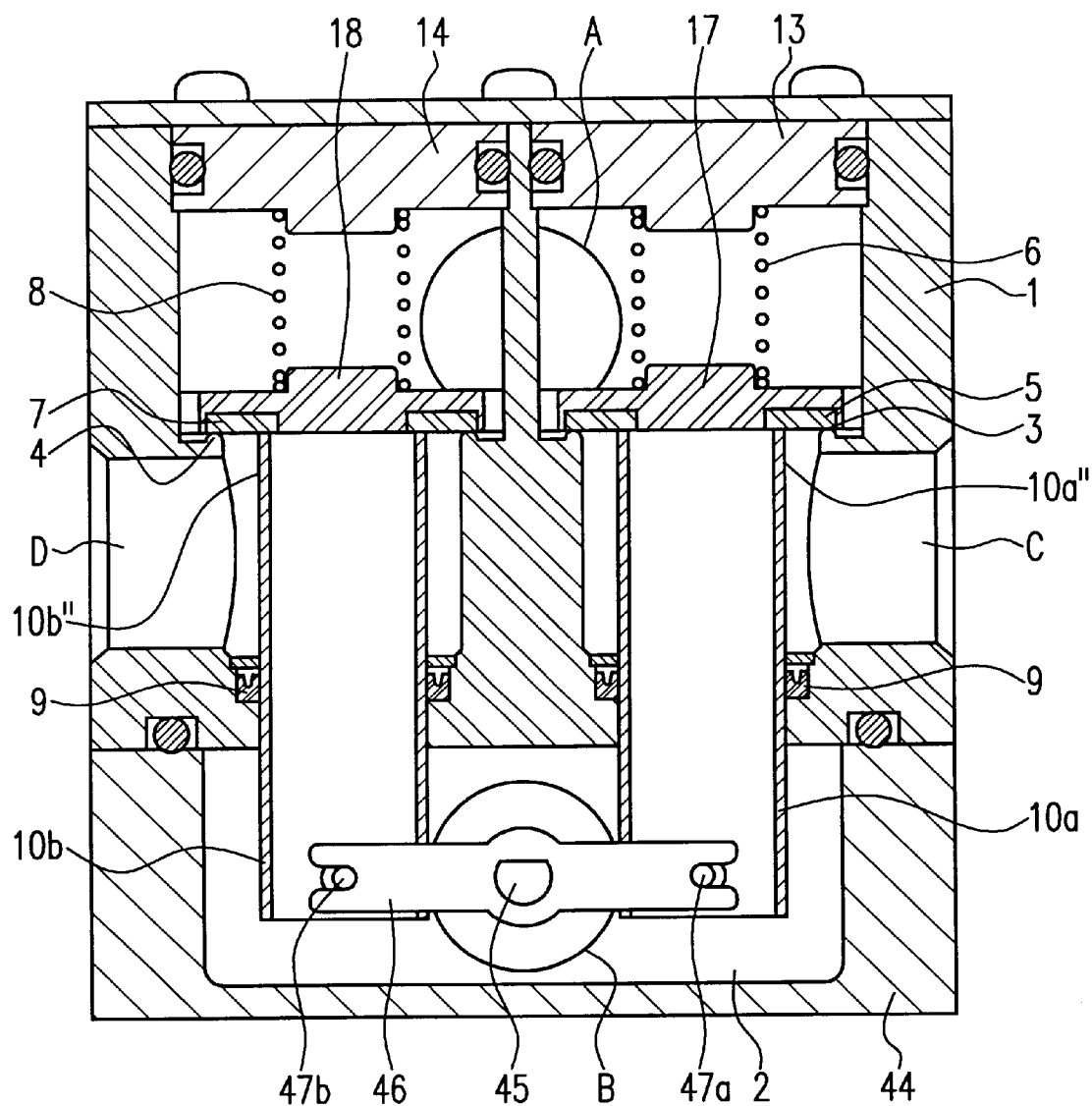
Figure 24:
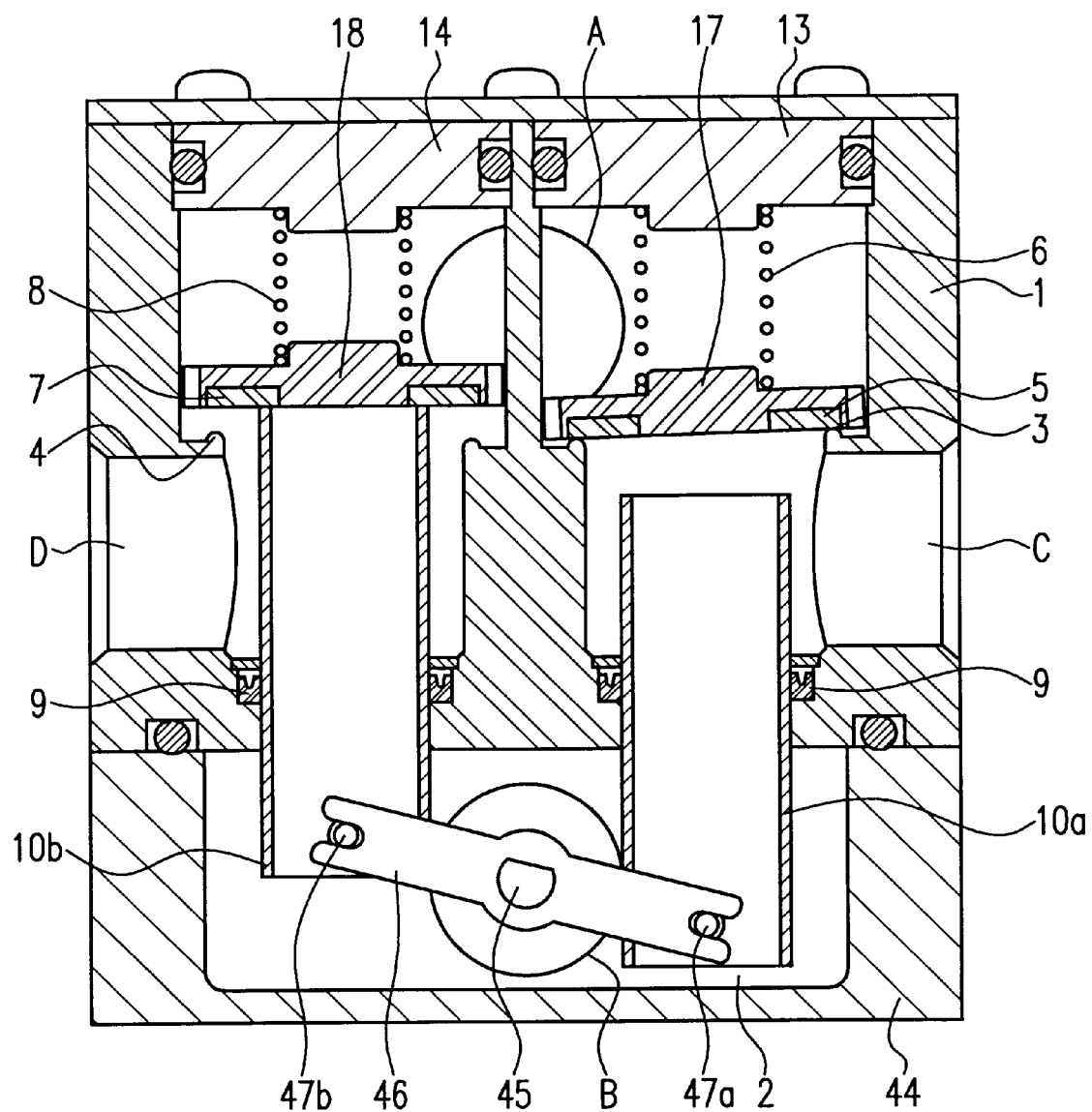
Figure 25:
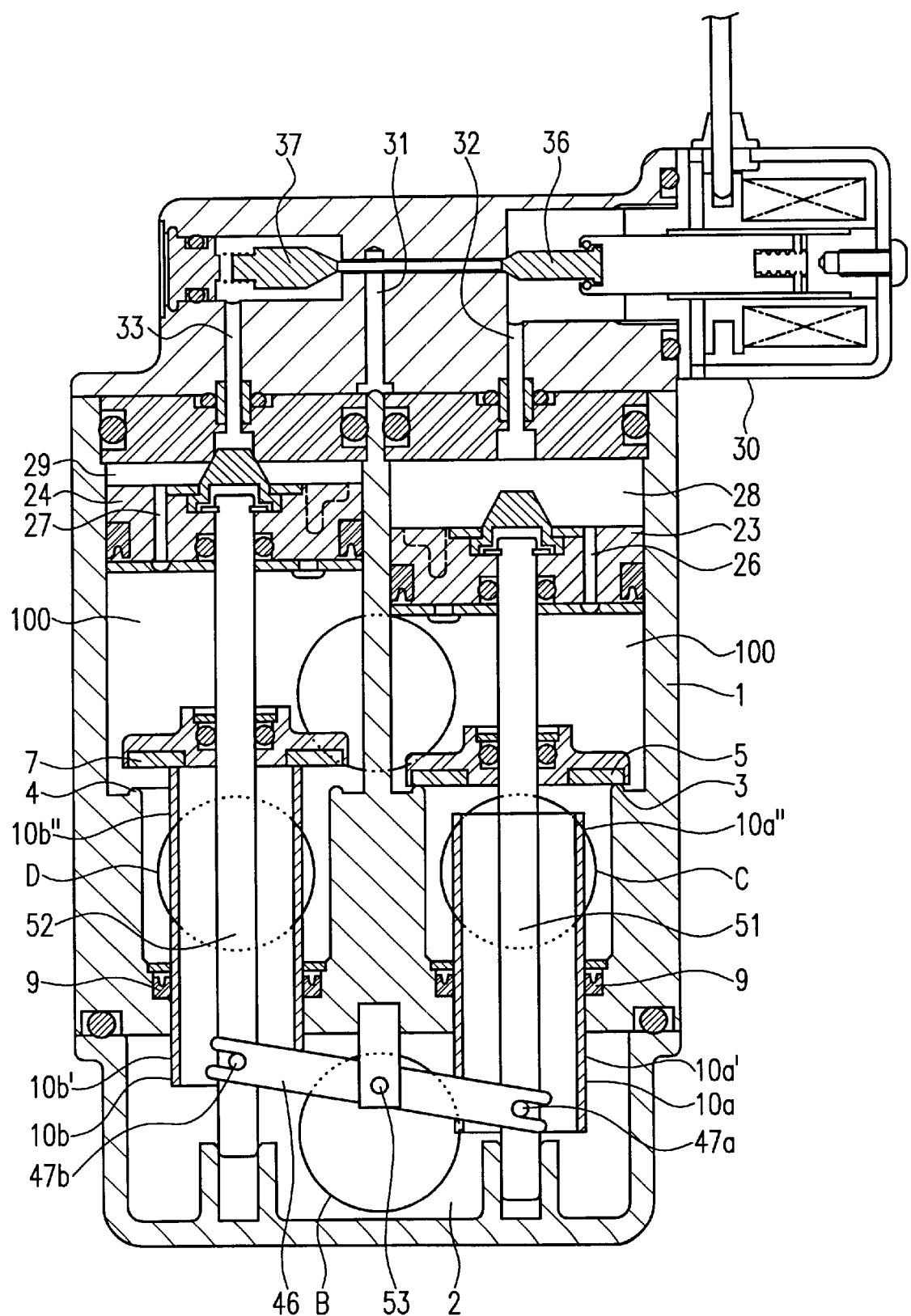

Embodiments of the invention will be explained with the help of the accompanying drawings. In the drawings is:

FIG. 1—as schematic view of the first embodiment of a four-way selector valve switched into a first communication state, FIG. 2—the embodiment of FIG. 1 in a second communication state, FIG. 3—a side view of the first embodiment, FIG. 4—a longitudinal sectional view of the structural design of the first embodiment, FIG. 5—a schematic section view (cross-section) of the valve case of the first embodiment, FIG. 6—a schematic cross-section view of another part of the valve case of the first embodiment, FIGS. 7 and 8—partly enlarged longitudinal sectional views of a detail of the first embodiment, in a closing state and in an opening state, FIG. 9—a longitudinal sectional view of the embodiment of FIG. 4 in another communication state, FIG. 10—a longitudinal sectional view of a second embodiment of a four-way selector valve, FIGS. 11 and 12—longitudinal sectional views of a third embodiment of a four-way selector valve in different communication states, FIG. 13—a longitudinal sectional view of a third embodiment in a slightly modified design and in a communication state where all pipes are separated from each other, FIG. 14—a longitudinal sectional view of a fourth embodiment of a four-way selector valve, FIG. 15—a longitudinal sectional view of a fifth embodiment of a four-way selector valve, FIGS. 16, 17 and 18—longitudinal sectional views of a sixth embodiment of the four-way selector valve in different communication states, FIG. 19—a longitudinal sectional view of the sixth embodiment in a slightly modified design compared to FIG. 18, FIGS. 20, 21 and 22—longitudinal sectional views of a seventh embodiment of a four-way selector valve in different communication states, FIG. 23—a longitudinal sectional view of the seventh embodiment with a slightly modified design compared to FIG. 22, FIG. 24—a longitudinal sectional view of an eighth embodiment of a four-way selector valve, and FIG. 25—a longitudinal sectional view of a ninth embodiment of a four-way selector valve.

In FIGS. 1 and 2 the structure of a first embodiment of a four-way selector valve is schematically illustrated only. Concise design structures can be found for the first embodiment in FIGS. 4 and 9. Such four-way selector valves are used for selecting refrigerant pipe interconnections of heating-cooling combination apparatuses of a heat-pump in automobiles, etc., where a first pipe A containing a high pressure refrigerant communicates with an outlet of a not shown compressor, a second pipe B containing low-pressure refrigerant communicates with an inlet of the compressor, and a third pipe C and a fourth pipe D containing refrigerant communicate with a condenser or evaporator (not shown).

First pipe A is connected to a sealed valve case 1. In valve case 1 a separate chamber 2 is formed communicating with second pipe B. Said separate chamber 2 is separated from a space 100 communicating with first pipe A in valve case 1. Separate chamber 2 is confined by valve case inner walls 2a. Furthermore, within space 100 connecting portions are defined by valve case inner walls 4a and 3a communicating with said third pipe C and said fourth pipe D. Said walls 2a, 4a, 3a contain coaxial bores where circular sealing means 9 are mounted. Walls 3a, 4a define first and second valve seat rings 3, 4, each in the shape of a cylindrical end opening facing towards the ends of valve case 1 and communicating with the third and fourth pipes C, D.

In space 100 and facing the first and second valve seat rings 3, 4 first and second valve disks 5, 7 are provided, the diameter of which is larger than the diameter of each associated valve seat ring 3, 4. Said valve disks 5, 7 are made with flexible rubber, etc. are arranged to be pressed in closing direction by the remanent forces of first and second compression coil springs 6, 8 against said first and second valve seat rings 4, 3.

In valve case 1 a cylindrical valve 10 with the shape of a long and narrow hollow cylinder is moveable in axial direction. Said cylindrical valve 10 is sealingly guided by sealing means 9 in the bores of walls 2a, 4a, 3a. Said cylindrical valve 10 consists of a first cylindrical hollow valve 10a and a second and coaxial cylindrical and hollow valve 10b. Said cylindrical valve 10 is apt to move in axial direction, i.e. in the direction of its longitudinal axis and also, at least substantially, in the direction of the axis of each valve seat ring 3, 4. A middle part of cylindrical valve 10 between both cylindrical valves 10a and 10b leads into separate chamber 2. In detail, each cylindrical valve 10a, 10b is provided with first and second ends 10a', 10b'; 10a", 10b". Both first ends 10b', 10a' are separated in axial direction so that a cut out hole is formed in the region of a motion link 11 coupling both cylindrical valves 10a, 10b. Said second ends 10a", 10b" are inserted into said connection portions defined by walls 3a, 4a where said third and fourth pipes C, D are connected.

Into each gap between the cylindrical valve 10 and bores in the walls 4a, 2a, 3a annular seal members 9 like flexible O-rings are inserted to prevent leakage of refrigerant between space 100, separate chamber 2 and said connection portions. The total length of the cylindrical valve 10 is almost equal to the axial distance between said first and second valve seat rings 3, 4. According to this structure, as shown in FIG. 1, when cylindrical valve 10 moves valve disk 5 against first compression coil spring 6 valve disk 5 is departing from first valve seat ring 3. The diameters of the second ends 10a", 10b" are smaller than the inner diameters of the valve seat rings 3, 4. Simultaneously second valve disk 7 is pressed by coil spring 8 onto second valve seat ring 4, while separate chamber 2 is communicating via first end 10b' with the connecting portion and fourth pipe D. First valve disk 5 being pressed by coil spring 6 onto second end 10a" separates space 100 from separate chamber 2. According to this first pipe A is communicating with third pipe C via valve ring seat 3 while simultaneously second pipe B is communicating with fourth pipe D.

In FIG. 2 another communication state has been selected. By not shown drive means cylindrical valve 10 has been moved upwardly. Second valve disk 7 has been lifted from its associated 2 second valve seat ring 4; second valve disk 7 is closing second end 10b". Simultaneously first valve disk 5 is seated on its associated first valve seat ring 3 by coil spring 6 while second end 10a" is departed from first valve disk 5 and is opening a communication from third pipe C via a hollow inner bore of first cylindrical valve 10a towards separate chamber 2 and second pipe B. Second and third pipes B, C then are separated from space 100, while simultaneously space 100 is in communication with fourth pipe D so that first and fourth pipes A, D are interconnected.

FIG. 3 shows a side view of a four-way selector valve in which a solenoid valve 30 is used to control a pilot valve controlling the movement of the cylindrical valve 10. Solenoid valve 30 is mounted on the outer surface of valve case 1. Valve case 1 is cylindrical, both ends of it are closed by covers 13 and 14, respectively.

FIGS. 4 and 9 illustrate different communicating states of the four-way selector valve, while FIGS. 7 and 8 illustrate details in enlarged scale of FIGS. 4 and 9. In FIG. 4 section planes X-Z Y-Z defined in FIG. 3 are shown together.

A lateral section near a central part of valve case 1 containing separate chamber 2 is shown FIG. 5. Space 100 and separate chamber 2 are shown as separated circles of different sizes. In a sectional view according to FIG. 6 both end parts of valve case 1 outside said central part show a contour where two circles are overlapping and intersecting each other. Already mentioned covers 13 and 14 can be secured by caulking to both outsides of said end parts.

In this embodiment cylindrical valve 10 can be constructed as a one pieced component or can be constructed as including a first cylindrical valve 10a and a second cylindrical valve 10b, both connected in series and coaxial with each other by a joint pipe 10c defining said motion link 11 and forming the cut-out hole connecting the interior of both cylindrical valves 10a, 10b with separate chamber 2.

Instead of walls 3a, 4a as shown in FIG. 1 in FIG. 4 and 9 chamber members 15 and 16 are secured in valve case 1 in order to define said communication portions for the third and fourth pipes C, D, and also defining the first and second valve seat rings 3, 4. A rigid plastic-made valve support disk 17 is inserted between first valve disk 5 and first compression coil spring 6, while a rigid plastic-made valve support disk 18 is inserted between the second valve disk 7 and the second compression coil spring 8. Both valve disks 5, 7 are fixed by adhesion to the valve support disks 17, 18 respectively. Part of the walls of separate chamber 2 are first and second cylindrical members 21, 22 secured gas-tight within valve case 1. In both members 21, 22 the cylindrical valves 10a, 10b are fitted moveable in their axial directions. On corresponding inner surfaces of both cylindrical members 21, 22 first and second piston members 23, 24 are fitted moveable in axial direction so that inner spaces of both cylindrical members 21, 22 are closed by said piston members 23, 24 in order to form first and second pressure control chambers 28, 29, respectively. Said first and second piston members 23, 24 are fixed on cylindrical valve 10, so that driving force given to both piston members 23, 24 leads to moving both cylindrical valves 10a, 10b in axial direction. Via orifices 26, 27 with very small cross-sections formed in piston members 23, 24 both pressure control chambers 28, 29 constantly communicate with space 100 leading to first pipe A in valve case 1.

A pair of valve parts 36, 37 interconnected as one body with a narrow rod can be moved in axial direction by means of a said solenoid valve 30. A path 31 leading into separate chamber 2 communicates with one of pilot holes 32, 33 leading into the corresponding pressure control chamber 28, 29, while simultaneously the other pilot hole is closed. At the mouths of pilot holes 32, 33 in pressure control chambers 28, 29 similar open-close valves 34, 35 (FIGS. 7 and 8) are provided allowing to close pilot holes 32, 33 when valves 34, 35 respectively are pressed down by piston members 23, 24.

FIGS. 7 and 8 show the state of closing or opening valves 34, 35. Normally when valve 34 or 35 is not pushed by piston member 23 or 24 said valve is maintained open by the force of a compression coil spring.

According to FIG. 4 the path between the first pressure control chamber 28 and separate chamber 2 leading into second pipe B at low pressure is closed with first valve part 36 while second valve 37 remains open, when solenoid valve 30 is switched off from an on-state. Accordingly, first pressure control chamber 28 receives gradually increasing high pressure via first orifice 26 while simultaneously second pressure control chamber 29 connected to separate chamber 2 receives low pressure. A pressure difference is created causing that the volume of second pressure control chamber 29 is reduced and that piston members 26, 24 are moved. Since then cylindrical valves 10a, 10b are moved together with piston members 23, 24 in FIG. 4 first pipe A communicates with third pipe C, while second pipe B communicates with fourth pipe D, until finally by the second piston member 24 second open-close valve 35 is closed.

When, as shown in FIG. 9, the solenoid valve 30 is switched from the previous state, the path between the second pressure control chamber 29 and separate chamber 2 leading into second pipe B at low pressure is closed with second valve part 37 while first valve part 36 opens. Via second orifice 27 second pressure control chamber 29 is receiving gradually increasing high pressure while first pressure control chamber 28 contains the low pressure of separate chamber 2. The pressure difference thus created again moves piston members 23 and 24 and with them cylindrical valves 10a, 10b upwardly, until first pipe A communicates with fourth pipe D, while second pipe B communicates with third pipe C until finally first open-close valve 34 is closed by being pushed by first piston member 23.

In this way with said pilot valves driven according to the on-off states of the solenoid valve 30 allows to move cylindrical valves 10a, 10b are moved in axial direction in order to select different communicating states of said four pipes A, 8, C and D.

Moreover, as seal members for moveable portions valve disks 5, 7 made with rubber seals to be pressed perpendicularly to the valve seat rings 3, 4 can be used, as well as angular seal members like O-rings, sealing the cylindrical valves 10a, 10b at their peripheries, so that it is not necessary at all to use seal members with high accuracy FIG. 10 shows a second embodiment without open-close valves 34, 35. The mouths or openings of pilot holes 32, 33 are directly controlled by piston members 23, 24 between their open and closed states.

FIG. 11 shows a third embodiment in which the communicating states of the pipe ways is selected by driving cylindrical valves 10a, 10b in axial direction forwards and backwards by means of a motor (not shown). The other components of the structures are similar to those of the first embodiment shown in FIG. 1.

A driving shaft 41 is rotatably supported with its middle shaft part 41b in valve case 1. A driving shaft part 31a coaxial with driving shaft 41 protrudes outside valve case 1. A eccentric drive shaft 41c protrudes eccentrically from middle shaft part 41b towards separate chamber 2 and is engagement with long sectional hole 10d formed perpendicularly to the axis of cylindrical valves 10a, 10b. Rotating driving shaft 41 by the motor (not shown) leads to a circular movement of eccentric shaft part 41c resulting in axial forward and backward movements of cylindrical valves 10a, 10b. As in FIG. 11 it is possible to change between two communication states. In the first state first pipe A communicates with third pipe C, while second pipe B is connected to fourth pipe D. In the other state first pipe A communicates with fourth D while second pipe B communicates with third pipe C (not illustrated).

According to FIG. 12 the axial length of cylindrical valves 10a, 10b and of components adjacent to them are selected such that the second end of the first cylindrical valve 10a departs from first valve disk 5 which is maintained in contact with the first valve seat ring 3, while the second end of the second cylindrical valve 10b departs from second valve disk 7 which is maintained in contact with the second valve seat ring 4. A communication state thus is obtained where both the third and fourth pipes C, D simultaneously communicate with second pipe B, while first pipe A is separated.

With longitudinal extensions adopted differently from the above-shown lengths (FIG. 13) the second end of the first cylindrical valve 10a can be closed by first valve disk 5 which simultaneously is maintained in contact with the first valve seat ring 3 while the second end of the second cylindrical valve 10b is closed by second valve disk 7 which simultaneously is kept in contact with the second valve seat ring 4. This allows to obtain a communication state where each of the pipes A, B, C, D is separated per se.

Moreover, both cylindrical valves 10a, 10b could be even longer in axial direction than shown. Then the first valve disk 5 seated on second end of first cylindrical valve 10a will be lifted from first valve seat ring 3 while second valve disk 7 seated on the second end of the second cylindrical valve 10b departs from the second valve seat ring 4. A communication state then is obtained where both third and fourth pipes C, D simultaneously communicate with first pipe A, while second pipe B is separated per se. Said possibilities can also be provided in the following embodiments.

In the fourth embodiment shown in FIG. 14 valve seat rings 3, 4 are formed to be inclined in relation to the longitudinal axis of cylindrical valves 10a, 10b. As a result and because the valve disks 5, 7 when contacting valve seat rings 3. 4 are inclined in relation to the corresponding second end of each of the cylindrical valves 10a, 10b, separation of the cylindrical valves 10a, 10b from their valve disks 5, 7 it is easier, because the resistance of adhesion between both is reduced due to the inclination.

In addition, because valve seat rings 3, 4 are formed to be inclined, also valve disks 5 and 7 contacting valve seat rings 3, 4 are not oriented perpendicular to the axis of cylindrical valves 10a, 10b, so that in the case of separating valve disks 5, 7 from their valve seat rings 3, 4 it is easy to separate them because the resistance of adhesion between both is reduced due to the inclination. A similar result could be achieved when the second ends of the first and second cylindrical valves 10a, 10b are oriented inclined in relation to a perpendicular plane on the axis of each cylindrical valve.

In FIG. 15 the cylindrical valves 10a, 10b are moved in axial direction backwards and forwards by a motor (not shown) via a mechanism with a rack 43 and pinion 44 for selecting different communicating states of the pipes (fifth embodiment). The rack 43 is held between a pair of protruding portions 45 inside cylindrical valves 10a, 10b. The motor drives pinion 44 engaging into rack 43 resulting in the necessary axial movement of cylindrical valves 10a, 10b.

FIGS. 16 to 18 show a sixth embodiment using valve supports 17, 18 shaped like valve spools received in valve seat rings 3, 4. Valve disks 5, 7 have high pressure side valve disks 5a, 7a, for contact with valve seat rings 3, 4, and low-pressure valve disks 5b, 7b for contacting the corresponding second ends of cylindrical valves 10a, 10b. Said high pressure valve disks and low pressure valve disks are made separately and are mounted separately at valve support 17, 18. The other components are similar to those of the third embodiment of FIG. 11. In FIG. 16 first pipe A communicates with third pipe C, second pipe B communicates with fourth pipe D. FIG. 17 indicates a communication state where first pipe A communicates with fourth pipe D while second pipe B communicates with third pipe C.

Moreover, FIGS. 18 and 19 show communication states where (FIG. 18) second pipe B simultaneously is communicating with both the third and fourth pipes C, D, while in FIG. 19 each of the pipes A, B, C, D is separated per se from the other ones.

FIG. 20 and 21 indicate a seventh embodiment in which said first and second cylindrical valves 10a, 10b are arranged side by side and in parallel. Each first end of the cylindrical valve opens into separate chamber 2 communicating with second pipe B. A motor shaft 45 allows to simultaneously move both cylindrical valves 10a, 10b coupled with each other by said link motion for opposite axial reciprocal displacements. Pins 47a, 47b are formed inside cylindrical valves 10a, 10b and engaged into both ends of a rotatable rocker arm 46 (seesaw beam) connected to motor shaft 45. The other components are also arranged in parallel, namely the respective valve seat rings 3, 4 and their valve disks 5, 7. In the seventh embodiment as shown both cylindrical valves 10a, 10b are arranged side by side and in parallel. They could, however, also be arranged in a V-like or A-like configuration.

FIG. 20 indicates a communication state where first pipe A communicates with third pipe C while second pipe B is connected to fourth pipe D. FIG. 21 indicates a communication state where first pipe A communicates with fourth pipe D, while second pipe B is connected to third pipe C.

FIG. 22 and 23 indicate modified designs allowing further communication states. In FIG. 22 the second pipe B is communicating simultaneously with both the third and fourth pipe C, D. In FIG. 23 all pipes A, B, C, D are separated from one another.

FIG. 24 shows that valve seat rings 3, 4 are inclined in the seventh embodiment as in the fourth embodiment of FIG. 14 allowing it to obtain working effects similar to those already described.

FIG. 25 indicates an eighth embodiment in which as in the first embodiment pilots valves are driven by solenoid valve 30 in order to move cylindrical valves 10a, 10b when selecting different communication states. Moreover, also central path 31 is used for pilot pressure and communicates with second pipe B, namely the low-pressure refrigerant pipe (the communication path not shown). Piston members 23, 24 are connected with rods 51, 52 and via said rods 51, 52 with cylindrical valves 10a, 10b. Cylindrical valves 10a, 10b furthermore are coupled with each other by a link motion having seesaw-arm 46 driven like a seesaw and being centred on a shaft 53 secured in valve case 1. Both ends of arm 46 engage at pins 47a, 47b mounted on rods 51, 52.

By the use of the link motion coupling the first and second cylindrical valves 10a, 10b in order to move them in their respective axial directions it is possible to change at least between two communication states. In one state the first pipe A communicates with third pipe C while second pipe B connects with fourth pipe D. In the other state first pipe A communicates with fourth pipe D while second pipe B leads into third pipe C.

Since as seal members for moveable components of the four-way selector valve disks 5, 7 are used made with rubber seats to be pressed perpendicularly onto valve seat rings 3, 4, and furthermore having annular seal members like O-rings sealing the outer peripheries of cylindrical valve elements 10a, 10b, as well as rods 51, 52. It is possible to combine parts in general level, i.e. no parts are required for which the machining accuracy has to be high first and second valve disks 5, 7 in FIG. 25 are shown as disk rings with an outer diameter slightly larger than the diameter of valve seat rings 3, 4 and an inner diameter slightly smaller than the inner diameter of the second end of cylindrical valves 10a, 10b. The diameter of valve seat rings 3, 4 is considerably larger than the diameter of said second ends. However, it is possible, to use a design similar to FIG. 16, i.e. to have a spool shaped spring support 17, 18 carrying two axially spaced apart valve disk rings 5a, 5b, 7a, 7b, each cooperating either with a valve seat ring or a second end. In this case the diameter of the valve seat ring 4, 3 could be made smaller than the diameter of the second end with the advantage of a smaller pressure area onto which the high pressure in space 100 is acting when the respective valve (valve seat ring 3, 4 and valve disk ring 7a, 5a) is closed. Said reduced pressure area results in lower actuation forces for opening said valves.

What is claimed is:

1. A four-way selector valve for selecting communications between four pipes (A, B, C, D) comprising:

a valve case (1) connected to communicate with a first pipe (A), a separate chamber formed within said valve case (1) to communicate with a second pipe (B), said separate chamber (2) being separated from a space (100) within said valve case (1), a first valve seat ring (3) placed in a communication path between a connecting portion of a third pipe (C) and said space (100) within the valve case, a second valve seat ring (4) placed in a communication path between a connecting portion of a fourth pipe (D) and said space (100) within the valve case (1), a movable valve element assembly (10) inserted into said valve case (1) for alternating co-operation with said first and second valve seat rings (3, 4), and a valve drive means connected to said movable valve element assembly (10) for at least selectively interconnecting said first pipe (A) either with said third pipe (C) or said fourth pipe (D) and simultaneously interconnecting the remaining one of said third or fourth pipes (C, D) which then is not connected with said first pipe (A) with said second pipe (B), wherein first and second valve disks (5, 7) are associated to said first and second valve seat rings (4, 3) and arranged to be pressed essentially in the direction of the axis of the respectively associated valve seat ring (3, 4) in closing direction by remanent force of first and second compression coil springs (6, 8), said first and second valve disks (5, 7) facing the corresponding first and second valve seat rings (3, 4) in said valve case (1), a first cylindrical and hollow valve (10a) is arranged to move axially and substantially in the direction of the axis of the associated valve seat ring (3, 4) and into lifting engagement with said first valve disk (5), said first cylindrical valve (10a) having a first end (10a′) and a second end (10a″), said first end (10a′) communicating with said separate chamber (2), said second end (10a″) being arranged to depart from or to come into contact with said first valve disk (5) from the side of said connecting portion of the third pipe (C), a second cylindrical and hollow valve (10b) is arranged to move axially and substantially in the direction of the axis of the associated valve seat ring (4) and into lifting engagement with said second valve disk (7), said second cylindrical, hollow valve (10b) having a first end (10b′) and a second end (10b″), said first end (10b′) communicating with said separate chamber (2), said second end (10b″) being arranged to depart from or to come into contact with said second valve disk (7) at the side of said connecting portion of the fourth pipe (D), said first and second cylindrical, hollow valves (10a, 10b) are provided side by side and parallel to each other with respect to the longitudinal axis of the hollow valves, each first end (10a′, 10b′) of said first and second cylindrical, hollow valves (10a, 10b) being arranged in said separate chamber (2) communicating with said second pipe (B), a link motion mechanism (46) coupling said first and second cylindrical, hollow valves (10a, 10b) for a common reciprocal movement of both cylindrical valves (10a, 10b) in their respective axial directions allowing to interchange at least between two states, namely, one state of interconnecting said first pipe (A) with said third pipe (C) and simultaneously connecting said second pipe (B) with said fourth pipe (D), and another state of interconnecting said first pipe (A) with said fourth pipe (D) and simultaneously said second pipe (B) with said third pipe (C).

2. Four-way selector valve as in claim 1, wherein circular sealings (9) like O-rings are provided in bores in inner valve case walls (2a), said walls separating either said space (100) in said valve case (1) from each connecting portion of said third and fourth pipes (C, D) and said separate chamber (2), or separating each connecting portion of said third and fourth pipes (C, D) from said separate chamber (2), said cylindrical, hollow valves (10a, 10b) being sealingly guided at their outer peripheries in said bores in said walls (2a).

3. Four-way selector valve as in claim 1, wherein when said first cylindrical valve (10a) at its second end (10a″) is closed by said first valve disk (5) being simultaneously maintained in contact with said first valve seat ring (3), and said second cylindrical valve (10b) at its second end (10b″) is closed by said second valve disk (7) being simultaneously maintained in contact with said second valve seat ring (4), a state is obtained where all pipes (A, B, C, D) are separated from each other.

4. Four-way selector valve as in claim 1, wherein when said first cylindrical valve (10a) with its second end (10a″) is released from said first valve disk (5) which simultaneously is maintained in contact with said first valve seat ring (3), and said second cylindrical valve (10b) with its second end (10b″) is released from said second valve disk (7) which is maintained simultaneously in contact with said second valve seat ring (4), a state is obtained where both said third and fourth pipes (c, D) simultaneously are communicating with said second pipe (B) while said second, third and fourth pipes (B, C, D) are separated from said first pipe (A).

5. Four-way selector valve as in claim 1, wherein each said valve disk (5, 7) being constituted by a rigid plate shaped spring support (18, 17) and a resilient disk mounted to said support, the outer diameter of said resilient disk essentially corresponding to the outer diameter of the associated valve seat ring (3, 4), while the inner diameter of said resilient disk ring essentially corresponds to the inner diameter of said cylindrical valve second end inner diameter.

6. Four-way selector valve for selecting communications between four pipes (A, B, C, D) comprising:

a valve case (1) connected to communicate with a first pipe (A), a separate chamber formed within said valve case (1) to communicate with a second pipe (B), said separate chamber (2) being separated from a space (100) within said valve case (1), a first valve seat ring (3) placed in a communication path between a connecting portion of a third pipe (C) and said space (100) within the valve case, a second valve seat ring (4) placed in a communication path between a connecting portion of a fourth pipe (D) and said space (100) within the valve case (1), a movable valve element assembly (10) inserted into said valve case (1) for alternating co-operation with said first and second valve seat rings (3, 4), and a valve drive means connected to said movable valve element assembly (10) for at least selectively interconnecting said first pipe (A) either with said third pipe (C) or said fourth pipe (D) and simultaneously interconnecting the remaining one of said third or fourth pipes (C, D) which then is not connected with said first pipe (A) with said second pipe (B), wherein first and second valve disks (5, 7) are associated to said first and second valve seat rings (4, 3) and arranged to be pressed essentially in the direction of the axis of the respectively associated valve seat ring (3, 4) in closing direction by remanent force of first and second compression coil springs (6, 8), said first and second valve disks (5, 7) facing the corresponding first and second valve seat rings (3, 4) in said valve case (1), a first cylindrical and hollow valve (10a) is arranged to move axially and substantially in the direction of the axis of the associated valve seat ring (3, 4) and into lifting engagement with said first valve disk (5), said first cylindrical valve (10a) having a first end (10a′) and a second end (10a″), said first end (10a′) communicating with said separate chamber (2), said second end (10a″) being arranged to depart from or to come into contact with said first valve disk (5) from the side of said connecting portion of the third pipe (C), a second cylindrical and hollow valve (10b) is arranged to move axially and substantially in the direction of the axis of the associated valve seat ring (4) and into lifting engagement with said second valve disk (7), said second cylindrical, hollow valve (10b) having a first end (10b′) and a second end (10b″), said first end (10b′) communicating with said separate chamber (2), said second end (10b″) being arranged to depart from or to come into contact with said second valve disk (7) at the side of said connecting portion of the fourth pipe (D), said first and second cylindrical, hollow valves (10a, 10b) are provided side by side and parallel to each other with respect to the longitudinal axis of the hollow valves, each first end (10a′, 10b′) of said first and second cylindrical, hollow valves (10a, 10b) being arranged in said separate chamber (2) communicating with said second pipe (B), a link motion mechanism (46) coupling said first and second cylindrical, hollow valves (10a, 10b) for a common reciprocal movement of both cylindrical valves (10a, 10b) in their respective axial directions allowing to interchange at least between two states, namely, one state of interconnecting said first pipe (A) with said third pipe (C) and simultaneously connecting said second pipe (B) with said fourth pipe (D), and another state of interconnecting said first pipe (A) with said fourth pipe (D) and simultaneously said second pipe (B) with said third pipe (C), in said valve case (1) a first pressure control chamber (28) is formed, one end of which is closed with a first piston member (23) connected with said first cylindrical valve (10a), a second pressure control chamber (29) is formed in said valve case (1) one end of which is closed with a second piston member (24) connected with said second cylindrical valve (10b), said piston members (23, 24) alternatively being moved by a pressure difference between both pressure control chambers (28, 29) so that said cylindrical valves (10a, 10b) are driven in axial direction for their alternating co-operation with both valve disks (5. 7).

7. Four-way selector valve as in claim 6, wherein the initial pressures within said pressure control chambers (28, 29) and by that said pressure difference are varied by solenoid-driven pilot valves using the pressure difference between said first pipe (A) and another pipe of the remaining pipes (B, C, D) like pipe (B) or pipe (D).

8. Four-way selector valve as in claim 1, wherein a motor and movement transmission means are used as means for commonly driving said cylindrical valves (10a, 10b) in their respective axial directions for alternating co-operation with both valve disks (5, 7).

* * * * *